US007991800B2

(12) United States Patent
Lawrence et al.

(10) Patent No.: US 7,991,800 B2
(45) Date of Patent: Aug. 2, 2011

(54) OBJECT ORIENTED SYSTEM AND METHOD FOR OPTIMIZING THE EXECUTION OF MARKETING SEGMENTATIONS

(75) Inventors: John A. Lawrence, Carmel, IN (US);
Paul J. Burrous, Carmel, IN (US);
Matthew J. Kelsey, Carmel, IN (US);
Curtis A. Knapp, Fishers, IN (US); Tim A. Sublette, Indianapolis, IN (US)

(73) Assignee: Aprimo Incorporated, Indianapolis, IN (US)

( * ) Notice: Subject to any disclaimer, the term of this patent is extended or adjusted under 35 U.S.C. 154(b) by 355 days.

(21) Appl. No.: 11/829,635

(22) Filed: Jul. 27, 2007

(65) Prior Publication Data
US 2008/0027788 A1   Jan. 31, 2008

Related U.S. Application Data

(60) Provisional application No. 60/820,739, filed on Jul. 28, 2006.

(51) Int. Cl.
G06F 7/00 (2006.01)
G06F 17/30 (2006.01)

(52) U.S. Cl. .......................................... 707/803; 705/10

(58) Field of Classification Search .................. 707/791, 707/999.003, 999.1, 999.102, 999.107, 803; 705/8–9, 10
See application file for complete search history.

(56) References Cited

U.S. PATENT DOCUMENTS

| | | | |
|---|---|---|---|
| 5,428,776 A | 6/1995 | Rothfield | |
| 6,240,411 B1 | 5/2001 | Thearling | |
| 7,308,437 B2 * | 12/2007 | Day et al. ........................... | 707/2 |
| 2003/0195888 A1 * | 10/2003 | Croft et al. ........................ | 707/10 |
| 2004/0103017 A1 * | 5/2004 | Reed et al. ....................... | 705/10 |
| 2005/0010477 A1 * | 1/2005 | Sullivan et al. .................. | 705/14 |
| 2005/0055275 A1 * | 3/2005 | Newman et al. ................. | 705/14 |
| 2007/0043697 A1 * | 2/2007 | Driesch et al. ..................... | 707/2 |
| 2007/0083417 A1 * | 4/2007 | Wagner et al. .................... | 705/9 |
| 2008/0033811 A1 * | 2/2008 | Brown et al. .................... | 705/14 |

FOREIGN PATENT DOCUMENTS

EP   0 627 691   12/1994

OTHER PUBLICATIONS

European Search Report for application 07397026.1, Nov. 27, 2007, 10 pages.
Chaudhuri, S, et al., "An overview of data warehousing and OLAP technology," SIGMOD Record, vol. 26, No. 1, Mar. 1997, pp. 65-74.
"IBM Informix Dynamic Server Administrator's Guide, Temporary Tables," IBM Corporation, Nov. 16, 2005, Retrieved at: http://publib.boulder.ibm.com/infocenter/idshelp/v10/index.jsp?topic=/com.ibm.admin.doc/admin365.htm.
Garcia-Molina, H., et al., "Database system implementation, the query compiler," Database System Implementation, Prentice Hall, 2000, pp. 329-364.

* cited by examiner

*Primary Examiner* — Kuen S Lu
*Assistant Examiner* — Susan F Rayyan
(74) *Attorney, Agent, or Firm* — Baker & Daniels LLP

(57) ABSTRACT

The present invention involves a computer system and method which implements a marketing management system. The computer comprises a processor, at least one database containing marketing information, and a database segmentation manager the segmentation manager is coupled to the processor and database. The database segmentation manager includes a node organizer for maintaining concatenated nodes defining a subset of data from the database. The node organizer includes a dataset node for creating a subset of said database according to query criteria and creating a temp table storing a portion of the fields and rows obtained by the query criteria. The segmentation manager further includes universe display software enabling an external user to view the database and nodes. The computer further has a graphic workflow manager capable of providing a visual representation with a plurality of items from the database and having a place and an order of a plurality of work tasks relating to the database.

19 Claims, 22 Drawing Sheets

Query Node 600

```
                                   602
┌─────────────────────────────────────────────────────────────┐
│ GENDER = M AND                                              │
│ (SCORE > 80 OR                                              │
│ SCORE is NULL)                                              │
│                                                             │
└─────────────────────────────────────────────────────────────┘

FIELD              CONSTANT
  ┌───┬─────────┬───┬─────────┬───┐  ┌─────┬─────┐  ┌─────┐
  │ ( │ GENDER  │ = │    M    │ ) │  │ AND │ OR  │  │ OK  │
  └───┴─────────┴───┴─────────┴───┘  └─────┴─────┘  └─────┘

Persist   ┌──────────┐
              │   None   │
              └──────────┘

┌──────────┐ ┌──────┐ ┌────────┐
                              │ Validate │ │ Save │ │ Cancel │
                              └──────────┘ └──────┘ └────────┘
```

Figure 6

Query Node 700
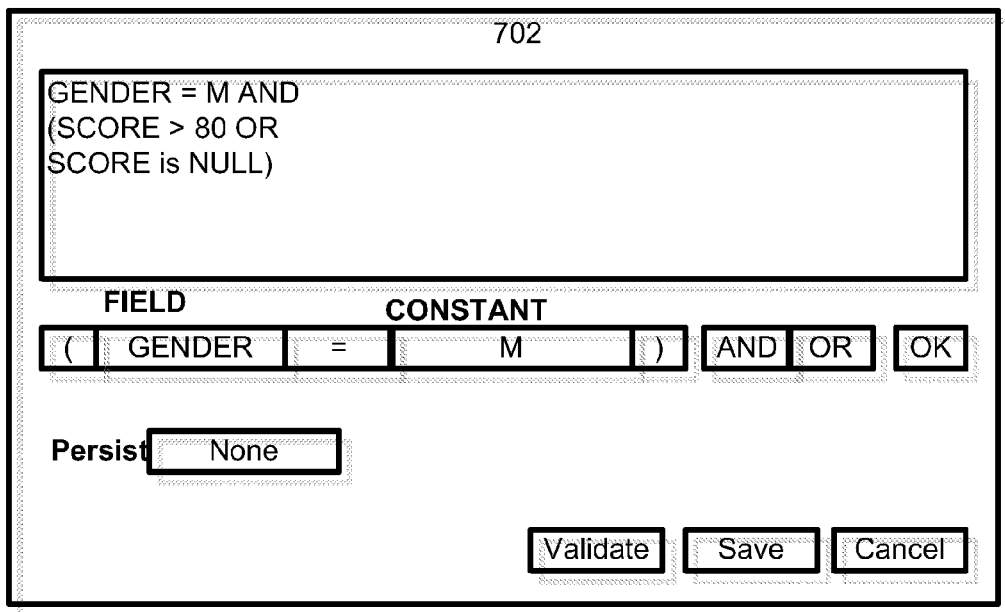
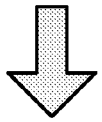
SQL 704
```
Select count(*)
FROM CUSTOMERS T1
INNER JOIN SCORES T2 ON (T1.CUST_ID = T2.CUST_ID)
WHERE T1.GENDER = 'M' AND (T2.SCORE > 80 or T2.SCORE is NULL)
```
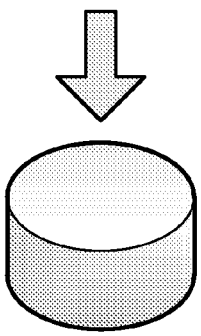
Marketing Database 706
Figure 7

OBJECT ORIENTED SYSTEM AND METHOD FOR OPTIMIZING THE EXECUTION OF MARKETING SEGMENTATIONS

CROSS-REFERENCE TO RELATED APPLICATIONS

The present application claims priority under 35 U.S.C. §119(e) of U.S. Patent Provisional Application Ser. No. 60/820,739, filed Jul. 28, 2006, the disclosure of which is explicitly incorporated by reference in this application.

BACKGROUND OF THE INVENTION

1. Field of the Invention

The invention relates to marketing management software. More specifically, the field of the invention is that of enterprise software for coordinating campaign management and workflow.

2. Description of the Related Art

The approaches described in this section could be pursued, but are not necessarily approaches that have been previously conceived or pursued. Therefore, unless otherwise indicated herein, the approaches described in this section are not teachings or suggestions of the prior art to the claims in this application and are not admitted to be prior art by inclusion in this section.

Campaign Management applications have existed in some form for years starting with mainframe list selection, moving on to client server applications, and now web-based applications. Campaign Management applications segment customers or prospects using an underlying marketing database with contact information as well as demographics, firmographics, product interest, purchases, web history, etc. The campaign management application also designs messages and offers for each group and outputs this list for use in marketing promotions across any channel—direct mail, email, web, call center, and so on.

Campaign Management systems access an underlying relational database system or set of files that hold customer and marketing data in order to perform segmentation of the customers or prospects for use in marketing programs. These individual segmentations are then stored in the database or in a file consisting or keys or keys and data. These files are used to create list output and tagged with specific offer and tracking codes for marketing tracking purposes.

Campaign Management applications use a variety of segmentation tools including group selection, exclude and merge, sort and splitting, model scoring, output, and other specialized tools. These tools create and manipulate the marketing files and their underlying data elements. The data elements being a key identifying a customer, household, account, or other marketing unit.

SUMMARY OF THE INVENTION

The present invention is a marketing management system and method which provides a node based mechanism for efficiently and effectively segmenting marketing campaigns. Campaign Management applications are designed to define customer segments (nodes) from an underlying relational database, manipulate this set (split, random sample, sort and split, etc.), tag each segment (node) with a tracking code for offer and creative tracking, and generate an output list with all the necessary segment (node) tracking and contact information. This Campaign Management segmentation scheme is presented in a visual flowchart, hierarchy, grid view or other view that shows the parent child relationships between segmentations. The use of nodes, the combination of nodes for query purposes, and the creation of temporary tables all reduce the amount of processing time needed for effective campaign management.

A node or cell is a group of customers, accounts, households, etc., used throughout a segmentation plan in campaign management. In complex campaigns, segmentations can incorporate hundreds of nodes. Returning counts for each node requires fewer processing steps and eliminates the streaming and inserting of data into tables or files. The system also looks across an entire segmentation plan and will batch up the node definitions or criteria that can execute together in one SQL statement. The system will then run one SQL statement that returns a batch or array of counts. This batching of selection criteria reduces the number of queries sent to the database to resolve a campaign segmentation and vastly improves campaign performance on the database, including run times. Such a system allows performance to scale to easily support hundreds of nodes in one campaign management segmentation.

Campaign management systems often interact with very large marketing databases with hundreds of millions of rows. It is critical that the campaign management system submit the best possible SQL to the underlying database. The focus of all know campaign management application has traditionally been isolated to improving individual SQL statements, applying hints, integrating indexing, caching, and proprietary database structures. This invention looks at the problem of campaign performance in new ways, not simply speeding up any one individual segment query, but to instead look at the entire segmentation and perform operations to dramatically improve the performance of the entire segmentation.

One of important aspect of campaign management systems is segmentation execution time and database query performance. Delays in the turn-around or cycle time of marketing segments for output with associated offers can cause increased costs, fines, and lost revenue.

In known campaign management systems, these systems approached performance improvement simply at a single processing node level. These systems would improve the submitted SQL for each node through the modification or "tweaking" of the SQL statement or the use of native drivers. This invention takes a more holistic view at improving query performance across the entire campaign. These ideas include aggregating campaign management nodes that can run together into a single SQL statement and single database query. This combines processing for multiple nodes into as few database queries as possible reducing the load on the database and dramatically reducing processing time.

Also, in the case of splitter nodes that produce multiple segments, these segments are commonly executed separately. These multiple segments can be concatenated into a single SQL statement and written to a single tagged table. The tagged table holds multiple segments without physically separating them. The segments are logically separated with a segment id field identifying each records membership in a specific segment. This is considerably more economical then creating multiple tables to store segment results, running multiple segment queries, and then inserting into multiple tables—one table for each segment.

Finally, the system of the present invention includes a method of dynamically updating one or more intermediate temp tables with segment IDs and all data attributes required to process all child nodes. This prebuilt query table speeds performance of downstream nodes allowing downstream node generated SQL to resolve quickly directly against the smaller more focused temp table rather than having to read directly from the full database across multiple tables and all database rows. The dynamic query table will automatically extend and rebuild based on the user adding new database fields in downstream processing nodes.

The system also includes a workflow component which is the automation of a business process, during which documents (information, issues, tasks, work orders, bug/defect reports etc.) are passed from one state to another for action, according to a set of rules defined by your workflow scheme. The system provides a workflow solution that is flexible enough to manage the way marketers work and the way they want to interact with their projects. A workflow template is a set of work tasks to perform and is hierarchically grouped and linked together to establish the flow of work. A web user interface allows the user to graphically place these work task in the proper order, including the roles to complete the work, the amount of time needed to complete the task and the work effort involved. Once the workflow template is drawn, the template is uploaded into a repository for use. There is a web user interface to associate the workflow template to a job. This generates a project schedule for that job and enables the users to complete work tasks through a web interface, based on the order in the template.

According to an aspect of the present invention, the processing of nodes is optimized for campaign management operations using a variety of methods to improve database processing performance.

According to a further aspect of the present invention, the method of optimizing campaign management segmentation involves reviewing the entire segmentation across all nodes in order to resolve multiple nodes in a single SQL statement for database processing.

According to a further aspect of the present invention, the method of optimizing campaign management segmentation involves running splitter nodes with multiple queries in a single SQL statement for database processing.

According to a further aspect of the present invention, the method of optimizing campaign management segmentation involves reviewing the entire segmentation and running nodes that generate multiple segments into one database statement that writes to a single table with a field identifying individual segments.

According to a further aspect of the present invention, the method involves creating intermediate processing temp tables that dynamically update the fields in the temp table as the user adds new fields to downstream processing nodes.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 6 is a screen shot diagram of a query node according to one embodiment of the present invention.

FIG. 7 is a schematic diagrammatic view of the execution of a query node on a database according to one embodiment of the present invention.

Figure 1:
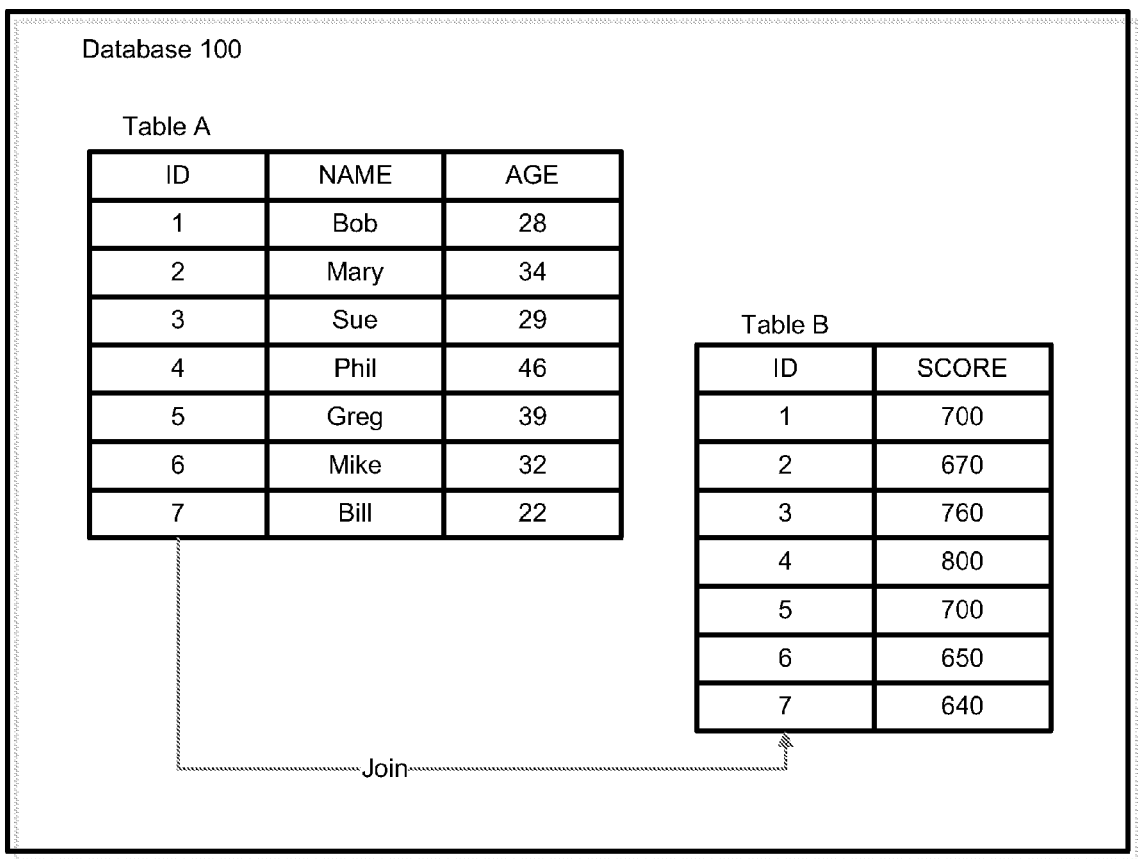
FIG. 1 is a schematic diagrammatic view of a database join operation according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects. Objects may also be invoked recursively, allowing for multiple applications of an objects methods until a condition is satisfied. Such recursive techniques may be the most efficient way to programmatically achieve a desired result.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. The computers have at least one processor for executing machine instructions, and memory for storing instructions and other information. Many combinations of processing circuitry and information storing equipment are known by those of ordinary skill in these arts. A processor may be a microprocessor, a digital signal processor ("DSP"), a central processing unit ("CPU"), or other circuit or equivalent capable of interpreting instructions or performing logical actions on information. Memory includes both volitile and non-volatile memory, including temporary and cache, in electronic, magnetic, optical, printed, or other format used to store information. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Navigator program sold by Netscape Corporation and the Internet Explorer sold by Microsoft Corporation (Navigator and Internet Explorer are trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks using a hypertext transfer protocol ("HTTP") or a secure HTTP ("SHTTP"), including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data ("CDPD") used on the Advance Mobile Phone Service ("AMPS"). The terms "wireless application protocol" or "WAP" mean a universal specification to facilitate the delivery and presentation of web-based data on handheld and mobile devices with small user interfaces.

Referring to FIG. 1, database 100 includes one or more tables, each table holding a specific category of related data, in the illustrated example tables A & B. Each table contains rows corresponding to individual records, units, or items in the database. The tables can have relationships with each other based on keys that link (join) the tables together. The term "table" refers to any group of associated records, whether stored in actual table format or otherwise. A table can hold any information related to a specific category, for example customer information, orders, demographic data, contact history, products, etc. The term "record" or "row" includes any associated set of fields within a table representing one item or unit in the table. For example, this would include a product in a products table, a customer in a customer table, or one order in an orders table. The term "join" includes the ability for two tables to connect or link based on a key or keys in order to connect related data across tables. For example, a join from the individual table to the orders table would be linked based on the individual key and would associate the individual with all of the individual's orders.

The present invention has application for analysis and selection of stored information in a database, no matter what the particular internal representation of the data is. The database may be digital information stored in any digital storage medium, such as conventional random access memory, tape storage, CD-ROM, and the like.

A database can be accessed using Structured Query Language (SQL), a database language based on open standards to retrieve and manage data in relational database management systems. SQL statements include query, data manipulation, data definition, and data control statements. A "query" retrieves data, count or fields, from a specified table or tables with the joins and criteria in a database. A query commonly includes a comparison predicate (WHERE clause) of Boolean logic with database fields to include all rows in the result set where the Boolean logic statement evaluates to True. A "data manipulation" statement is used to manipulate rows of data in a table to insert, update, delete, and merge rows. A "data definition" statement manipulates the table structure and entire tables of data in a database to create, drop, alter, and truncate tables. A "Data Control" statement manages security of database objects.

Databases can also include Stored Procedures. "Stored Procedures" are database subroutines that encapsulate complex, transactional, or multi-step database operations into a single scripted process. One example is a stored procedure that dynamically builds a set of Structured Query Language (SQL) commands to populate a random number in a set of records that is used to then split these records into some number of random segments.

Figure 2:
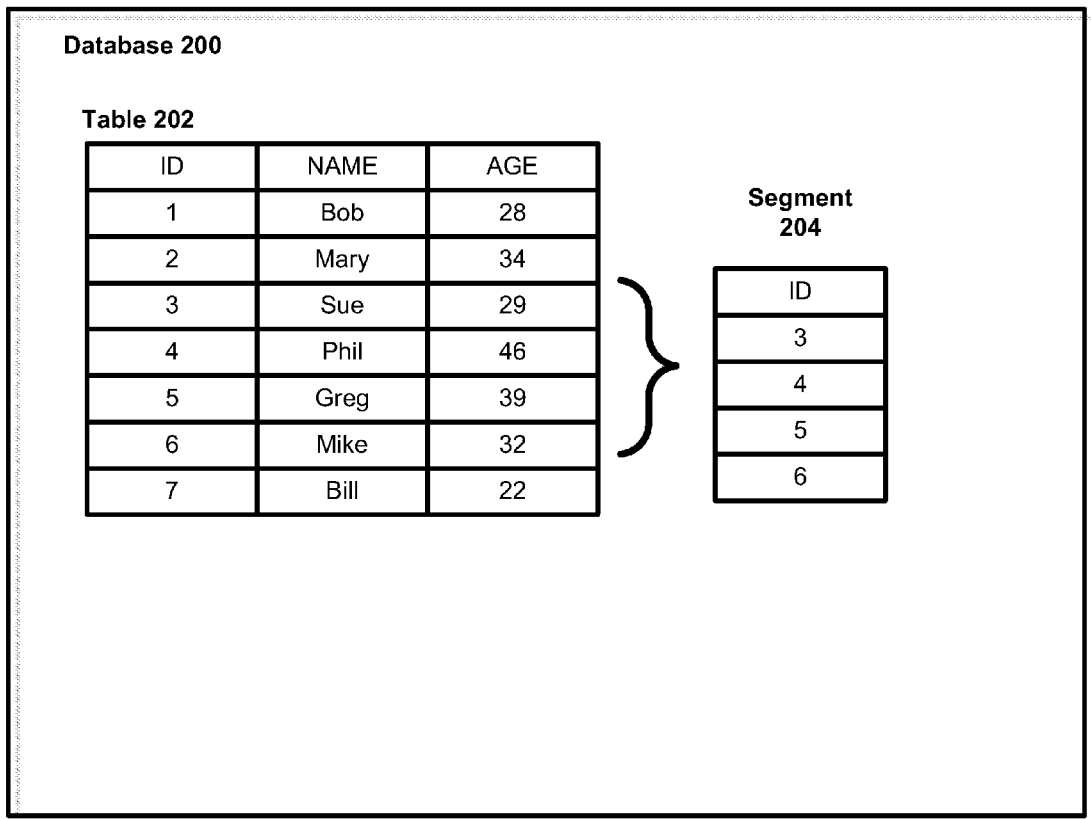
FIG. 2 is a schematic diagrammatic view of a segment defined from a table according to one embodiment of the present invention.

Referring to FIG. 2, database 200 may be used for marketing purposes, wherein database table 202 and its fields are queried against using SQL in order to define like segments 204 of customers, prospects, households, accounts, and other marketing units to approach with specific marketing offers. The term "segment" relates to a group of records corresponding to "marketing target records" (e.g. individuals, customers, households, account holders) that can take action and that have a set of common data criteria or field values relating them. A marketing segment may include individuals who purchased a product in category X, or households in a specific geographic location, or policy holders soon to lapse. The present invention also relates in general to campaign management systems which use these types of database resources to implement specific marketing offers or campaigns.

Figure 3:
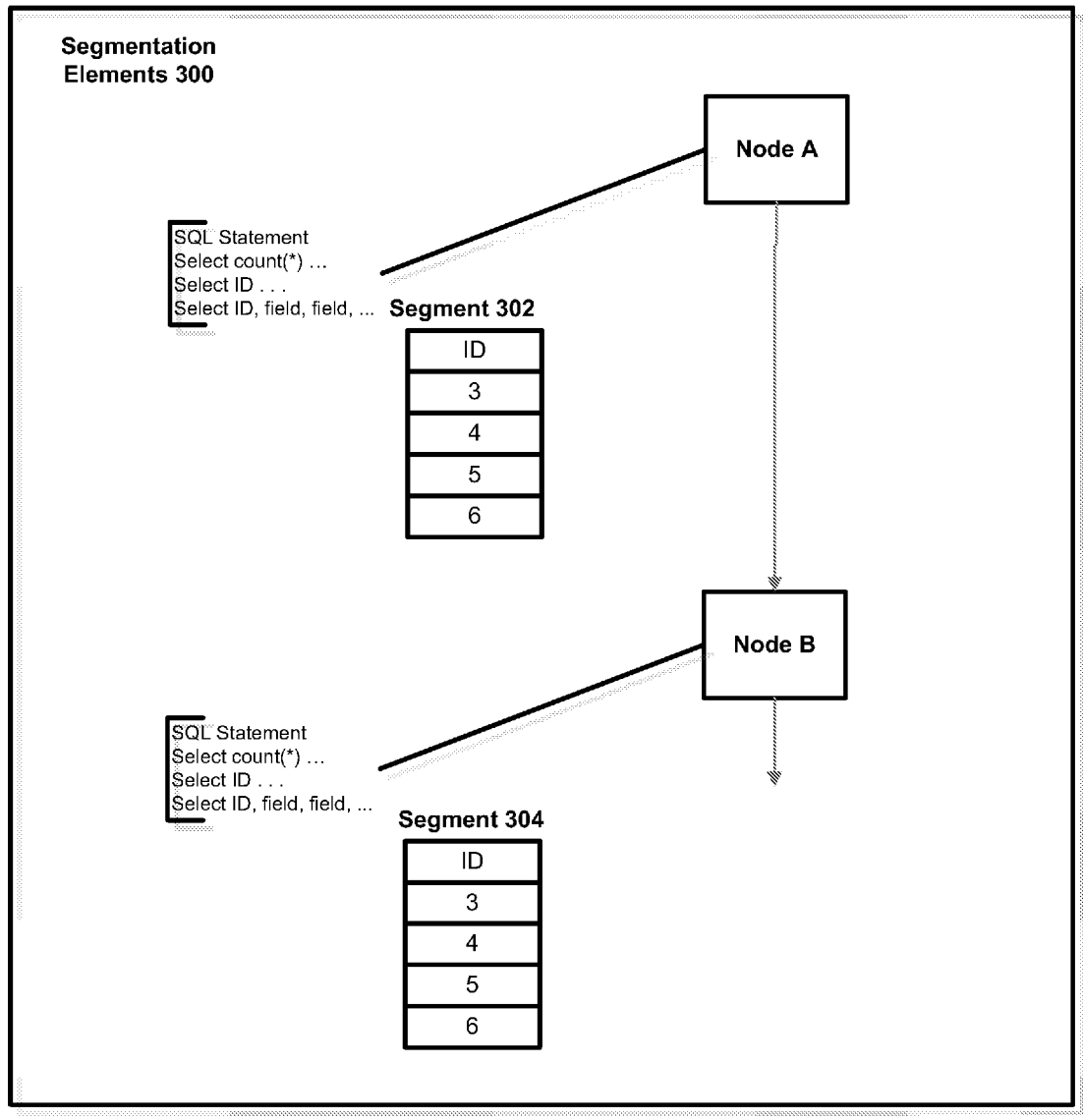
FIG. 3 is a schematic diagrammatic view of the segmentation elements according to one embodiment of the present invention.
Figure 4:
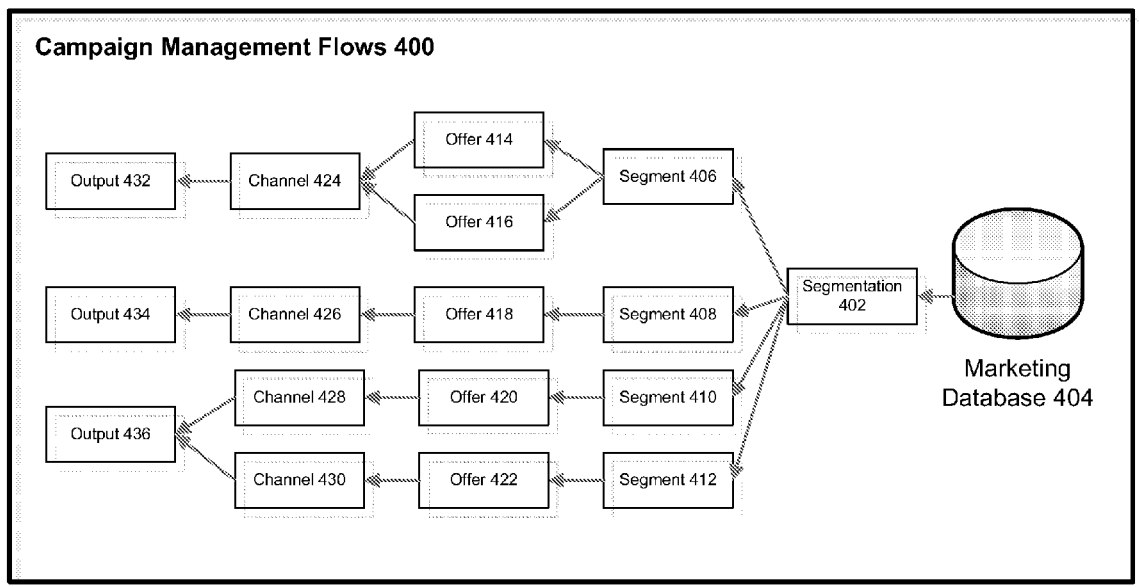
FIG. 4 is a schematic diagrammatic view of the campaign management flows according to one embodiment of the present invention.

Referring to FIG. 3, the segmentation of databases, more specifically marketing databases, is facilitated with a campaign management system that provides for database 200 to have a SQL operation performed on table 202 to define segment 204 which may then be further processed. The system provides a visual graphical user interface for the definition and management of customer segments or groups for marketing purposes. The physical marketing database tables, fields, and joins will also often be abstracted into a logical view or catalog. The system allows a marketer to select and categorize the records of the abstracted view of the database into segments shielding the marketing user from the complexities of generating. As depicted in FIG. 4, segmentation elements 300 includes nodes A and B with associated SQL statements that result in segments 302 and 304, respectively, after the SQL statements interacting with the marketing database.

Referring to FIG. 4, campaign management flows 400 allows a marketer to use the system to perform segmentation 402 on marketing database 404 to define segments 406, 408, 410, and 412; apply offers 414, 416, 418, 420, and 422 to these segments, and generate outputs 432, 434, and 436 through external marketing channels. An "offer" would be some sort of marketing effort or action directed to a marketing segment that could include an offer to buy, a promotion, a store sweepstakes to drive increased visits, a seminar, and other efforts. A "marketing channel" is the communication method to reach the specific marketing target customer which can include call center, email, direct mail, mobile, point of sale, kiosk, web, and other communication channels. The campaign management system may be implemented using a software program on a general purpose computer or server. Of course, various hardware implementations or hardware component designs could be used.

Figure 5:
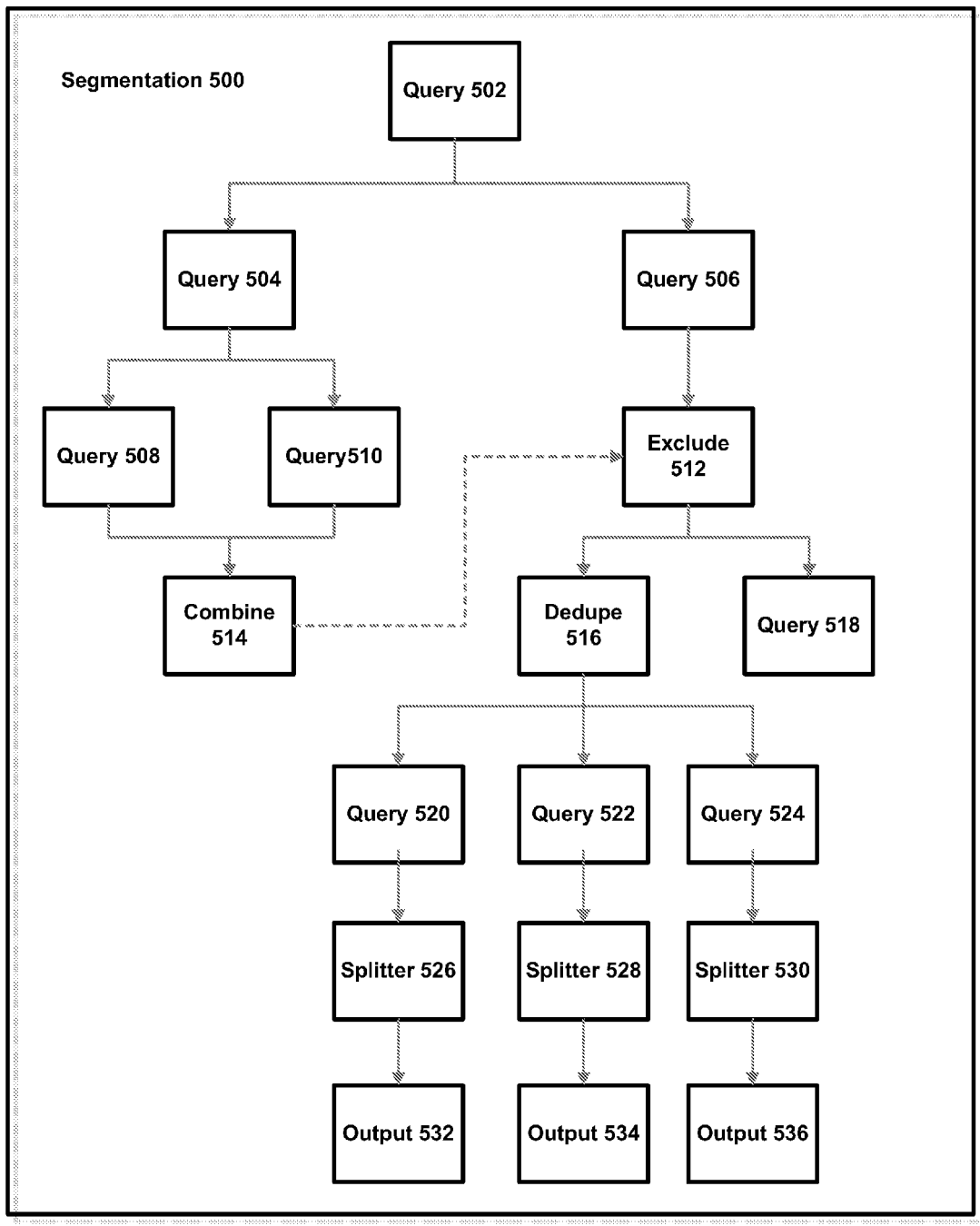
FIG. 5 is a schematic diagrammatic view of a multilevel segmentation according to one embodiment of the present invention.

Referring to FIG. 5, campaign management systems use a graphical user interface that allows the marketer or user to define segmentation 500 containing multiple levels of segments. A "segmentation" consists of multiple nodes or steps in a hierarchical, tree, or flowchart structure with parent and child relationships that generates multiple segments. Each "node" represents a different data processing operation to manipulate the parent segment and produce a child segment. Each node can generate one or more segments representing a set of customers or other marketing target based on number of different campaign management data processing/query operations. The list of common campaign management operations represented as a node in segmentation 500 includes query 502, 504, 506, 508, 510, 518, 520, 522, and 524; exclude 512; combine 514; splitter 526, 528, and 530; deduplication (dedupe) 516; and output processes 532, 534, and 536.

Additionally referring to FIG. 6, a "query" node may be represented in a screen shot for creating a segmentation. Query node 600 provides interface 602 and an underlying process for the user or marketer to define the selection criteria or Boolean logic to select a segment of marketing target records that satisfy some criteria. The marketer may select attributes from across multiple tables through an easy-to-use point and click interface, select comparison operators =, >, <, and then select a value or another field to compare against. Multiple criteria can be connected using "AND" or "OR" between criteria. The marketer does not have to write SQL, understand table joins, understand the actual table structure and field names, nor does the marketer have to understand the specific steps to create the segment or to pull a count on the segment defined by query node 600. As shown in FIG. 7, query node 700 using the marketer defined criteria from interface 702 converts these user interface instructions into SQL script 704, and submits SQL 704 to database 706 to return a count of the desired segment and/or pull a set of keys or IDs representing a unique marketing target record. If there is a preceding node with a result segment or segments, this query node will also limit the result segment for the current node to only those target records of database 706 available in the previous segment.

Referring back to FIG. 5, "exclude" node 512 in a segmentation provides an interface and underlying process for the user or marketer to define what node segments to subtract from the parent node to create a child segment. The exclude node compares target records from the parent segment to the target records in any number of other segments. Where there is a match or intersection, the records are not selected within the next results. The result segment from the exclude node will not include any target records present in the exclude segments. This exclusion node generates SQL to the underlying database. It returns a set of target IDs and/or counts as the result set.

Similarly, "combine" node 514 in a segmentation provides an interface and an underlying process for the user or marketer to define what node segments to add to the parent node to create a new child segment. The combine node unions target records from the parent segment to the target records in any number of other segments to create a new combined segment. The result segment from the combine node will include all target records present in all the selected segments including the parent. The combine node may offer functionality to select only the records that are present across all segments or the intersection of multiple segments. This combine node generates SQL to the underlying database. It returns a set of target IDs and/or counts as the result set.

Further, "splitter" nodes 526, 528, and 530 in a segmentation provides an interface and underlying process for the user or marketer to define a method of dividing the parent segment into multiple children segments. A marketer may define a splitter node to create multiple segments based on any combination of queries or criteria, random sort order, or sorted on an attribute or multiple attribute with no limits, limited by percentage, or limited by number of records for each child segment. One example of a splitter would be to create a decile or ten segments from the parent segment sorted by a propensity to buy score and customer profitability score. The result set would be ten segments with the highest propensity to buy and profitability scores in segment 1 and the lowest scores in segment 10. Another splitter example would be an A/B split for offer testing purposes. The members or target records of the parent segment would be randomly split into two child segments. The splitter node generates SQL to the underlying database to pull these segments returning a set of target IDs and/or counts.

Another relevant node is de-duplication (or "dedupe") node 516 which provides an interface and process to select one or some number of records that are in the same match group with a preference for a one target record based on a sort. One example, a marketer may wish to select one individual per household from a segment who is the oldest member of the household. The marketer would then select the match key of household ID, select a descending sort on age, and choose 1 record per match group. The result or child segment will now only hold one individual record per household. Dedupe node 516 generates an SQL statement and submits it to the underlying database to resolve the parent segment to the deduplicated segment. It returns a set of target IDs and/or counts as the result set.

Finally, upon completion of the campaign management system segmentation, a set of final segmentations at the end of the process tree will perform output processes 532, 534, and 536. The "output" node will take a final set of segments and generate output in any number of formats: flat file, database table, web services message out, email out, tape, or any form of digital output. The target records identified in the segments are output with the necessary tags or codes (e.g. cell codes, offer codes, creative package codes, etc.). One example, output may be formed that includes the name, an address field, and the particular offer. This output may then be provided to the appropriate facility for taking the assigned action. A subsequent output may also be written to a log table to track a history of which target records received what offers in what segments. The output node generates SQL to the underlying database to write the segment target records to a database table or to stream data to the server and onto the target marketing channel.

In known systems, each segment node described above would create its own SQL. Each segment SQL statement would execute independently with each segment having a separate result set for the specific segment and often its own segment temp table. Segments are associated with specific segment generated SQL and a specific set of segment results. This means that a segmentation with 10 nodes would at least generate 10 SQL statements, submit those 10 SQL statements to the database, and return 10 separate sets of results. This individual segment by segment resolution can take significant time to resolve each node.

Figure 8:
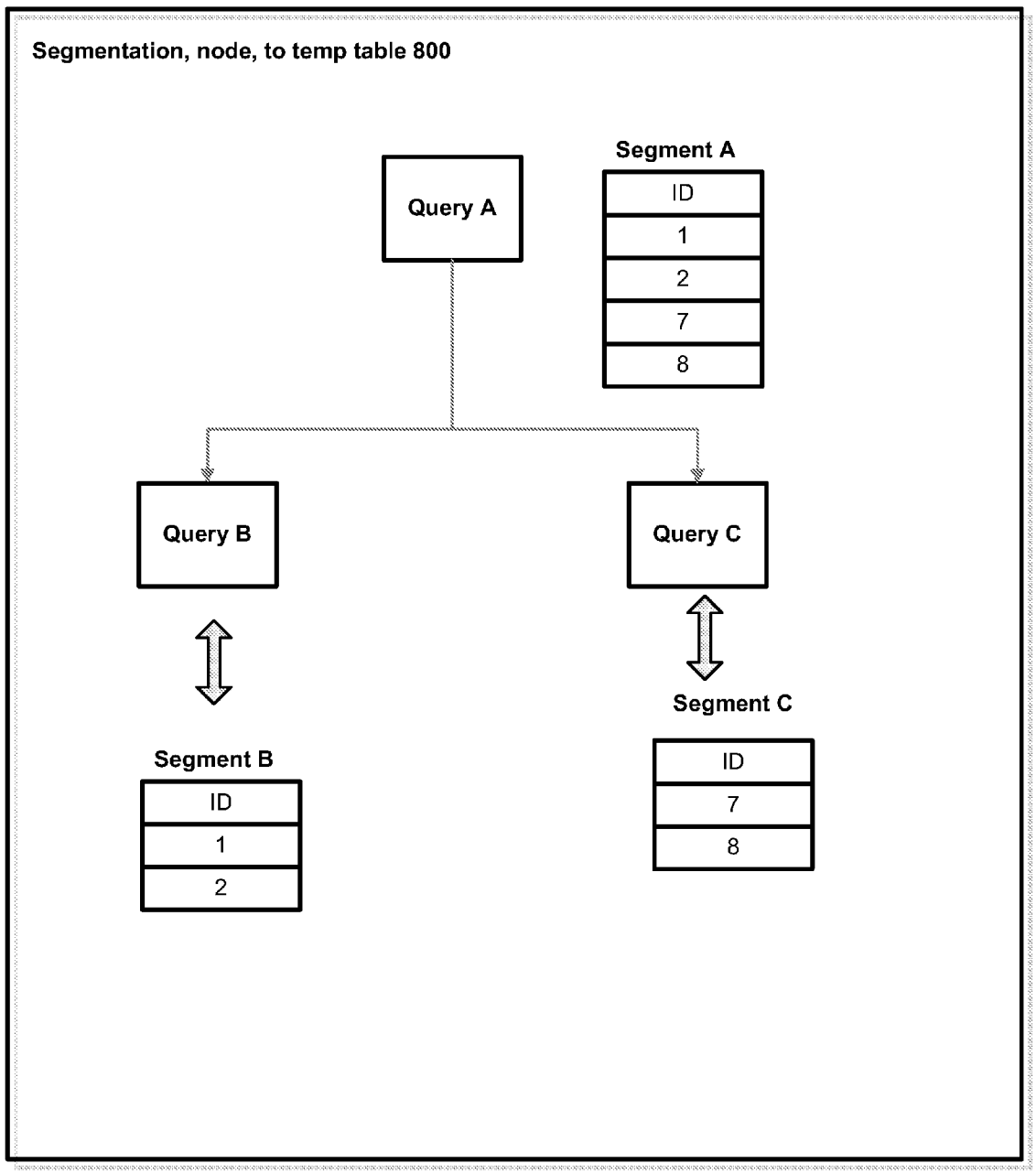
FIG. 8 is a schematic diagrammatic view of a query node creating a temporary table according to one embodiment of the present invention.
Figure 9:
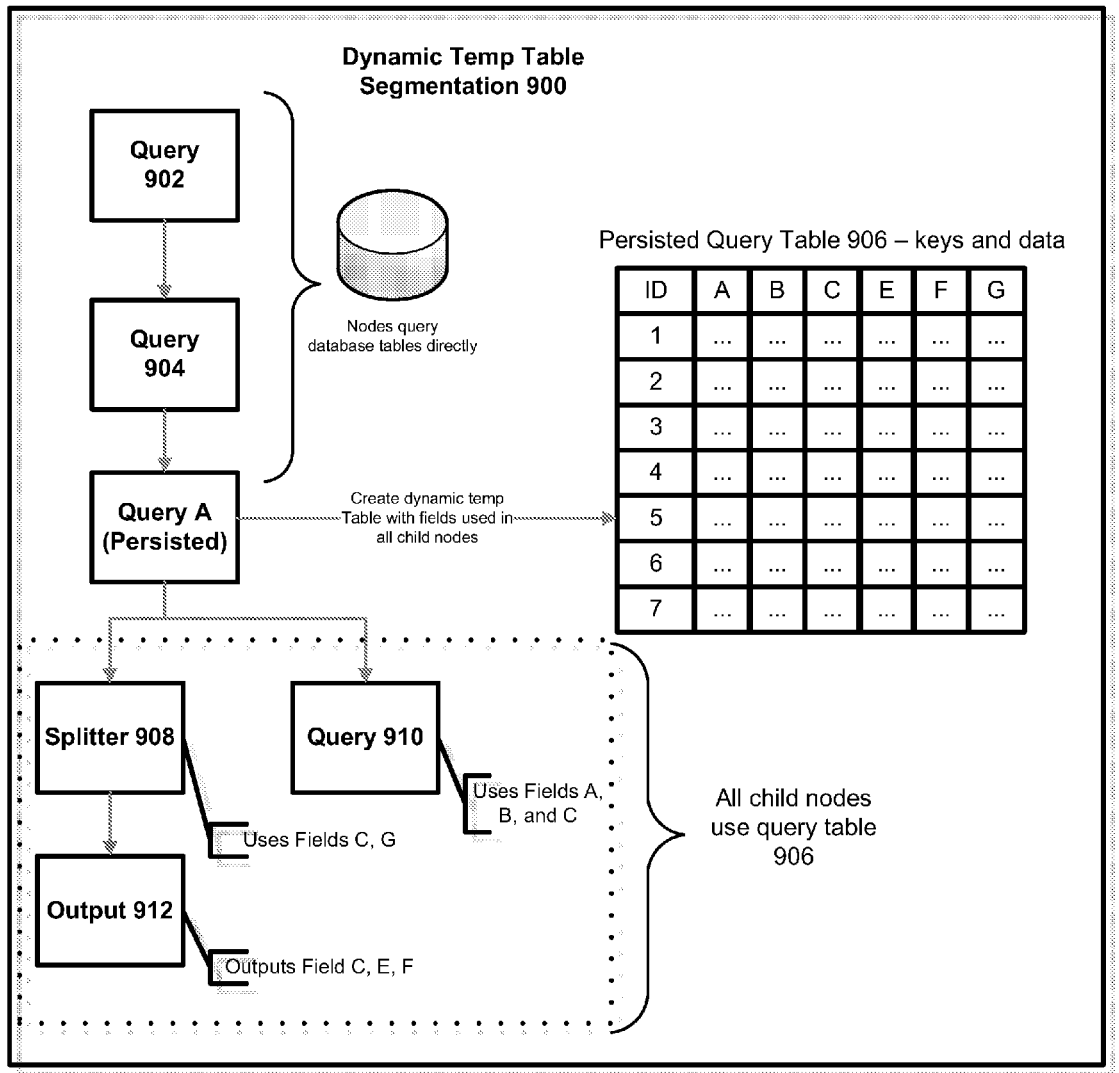
FIG. 9 is a schematic diagrammatic view of an implementation of a temporary table according to FIG. 8.

Referring to FIGS. 8 and 9, each result set for a node a segment within a segmentation also may have its own temp table of target record keys cached in the database. In FIG. 8, Query A creates segment A, and subsequent Query B and Query C create segments B and C, respectively, using only the data in segment A. As shown in FIG. 9, temp table 906 may include a set of target record keys (e.g. customer ID, account_number, policy_id, household_key) that are the result set of segmentation node created by Query A. Temp table 906 is used to filter all qualifying target records for child nodes Splitter 908, Query 910, and Output 912 which may perform exclude, combine, query, and other node operations. Temp table 906 keys may represent the full set of target record ids that qualify for further segmentation processing in the child cells. A campaign management segmentation can generate hundreds of temp tables depending on the number of nodes and segments it contains.

Another example of a temp table includes not only the target record keys but attribute or field data as well for the selected records. This keys and data temp table can further speed processing by defining a smaller table with fewer rows and attributes to satisfy downstream node processing. These temp tables are defined and built with a specialized output node called a "Dataset node" that allows a campaign management system user to specify the fields and rows to pull from the database and place into a temp table (i.e. dataset). The user defines the Dataset node query criteria and extracts fields within a segmentation to pull the desired fields and records. The dataset node once defined will generate the appropriate SQL to build and insert records into the temp table. As part of this process, the user will also be required to update the table catalog to be able to use the Dataset node temp table. The Dataset node temp table speeds processing by allowing all subsequent nodes to process against the smaller subset of the database instead of querying all table attributes, with joins, and with all rows. Other interfaces, other nodes, or other processes for use within a campaign management interface are possible.

In one embodiment of the present invention, the system is a web-based application delivered to a client browser without sacrificing ease-of-use or functionality. The Campaign Manager (CM) interface presents a traditional process flow metaphor with CM tools generating customer segments or nodes down branches of a tree until output. The CM interface offers traditional "thick client" functions including an icon-based process flow segmentation screen with point-and-click and drag-and-drop features, but delivered to a web browser client using only dynamic HMTL and JavaScript over standard HTTP or Secure SHTTP ports. The CM interface does not require any client downloads, plug-ins, ActiveX controls or applets—which avoids time-consuming downloads, version and installation problems on the client, and security risks. In the exemplary embodiment, CM also runs on an Apple Computer through a supported Safari browser.

The exemplary CM Application Server consists of the Web, Business, Services, and Data Tiers. These tiers can all deploy on one physical server. However usually the Web, Business, and Data tiers are installed on a Web Application server or server farm and the Services tier is installed on a separate Services/Application server or set of servers.

The Web Application server consists of Web, Business, and Data tiers. The Web Tier maintains and describes all CM screen elements, the User Interface (UI), in XML files. It parses the XML to build dynamically the appropriate ASP.NET UI objects that generate the HTML and JavaScript to deliver to the web client. This XML-based screen infrastructure provides a variety of customization options. The Business Tier consists of a set of objects describing the CM business functions including Universes, Segmentations, Offers, Treatments and more. The Business Tier incorporates an open Web Service interface based on industry standard XML, SOAP and Web Services Description Language ("WSDL") protocols. This allows the CM to integrate with other external systems using Web Services. Finally, the CM Data Tier stores and retrieves all CM objects from the Marketing data repository or the KnowledgeBase. The Data Tier manages a pool of database connections that deliver all object requests for applications, including CM, into and out of the data repository or KnowledgeBase.

The entire Aprimo Marketing platform is stateless, so there is no requirement to maintain a persistent connection for a user session, referred to as a "sticky session." With a stateless application, any Aprimo CM Web Application Server across an array of web servers or a server farm can service a request from any client session. This allows the Aprimo CM application with a hardware load balancer or Windows Load Balancing Service ("WLBS") to operate in a cluster and scale to serve hundreds of users. This clustering capability provides support for High Availability configurations to keep the CM application constantly up and running across clustered servers.

The CM Segmentation Service executes the user campaign segmentation flows, node counts, associates offers and treatments, and generates output tables and lists. The CM Segmentation Service is the modern day, scalable equivalent of the CM application server. The CM Segmentation Service is a multi-threaded service that can deploy across one or many servers to fully utilize any one server's resources and the pooled resources of a server cluster. These jobs execute without regard to the client session, so any Segmentation Service can run a submitted job for any client's CM segmentation. This allows the Segmentation Service to natively support server clustering and deliver CM functionality to a large marketing community—not just to a handful of marketing users.

The Segmentation Service is a thin app server. It connects to the external or internal marketing databases, generates and submits optimized SQL to resolve the segmentations and nodes, and all that returns from the database are counts and the occasional flat file output list. All the data and data manipulation work is function shipped to the underlying database server. This reduces the network traffic of pulling the data back and forth between the application server and the database. It also reduces the application server workload as it fully leverages the power of the database server to perform all data selection, storage, sorting and processing. The thin CM Segmentation Service delivers enterprise CM capability on Windows hardware because it eliminates this data transfer and processing overhead common on legacy CM systems.

The NT Service manages the execution and scheduling of the segmentation jobs across multiple Segmentation Service agents. The separate execution of the campaign jobs loosely couples it with the client interface. This allows for disconnected execution of the campaign segmentation. Therefore, a marketer can start a segmentation, close the segmentation while it is still running and return later to review counts and output. The NT Service also manages the scheduled execution of Campaign Manager segmentations for recurring and multi-wave marketing programs. CM scheduled campaigns will run a segmentation and generate output on a scheduled or recurring basis like a specific date and time or daily, weekly, monthly, yearly, etc. The campaign schedule is persisted in the KnowledgeBase. Thus, in cases where the application server or database goes down, the NT Service will automatically run the scheduled campaigns stored in the KnowledgeBase once service returns.

The CM system supports multiple external data sources as well as its own embedded marketing data mart ("MDM"). The CM connects to multiple external databases to allow marketers to develop their customer segments on their own marketing data. These sources could be a marketing data mart, enterprise data warehouse or some other source. In addition, Aprimo CM has its own embedded MDM in its application data repository to store customer master data, customer contact history and other customer transaction data like orders, responses and other information.

The Marketing KnowledgeBase contains all marketing data in one central repository. The spreadsheets, file folders, project plans and personal databases marketers use to track expenses, projects, collateral and customer lists can be replaced with the KnowledgeBase. This data repository includes campaign management specific information including offers, treatments, tasks, campaign schedules and campaign segments. The KnowledgeBase is an open relational database that consists of hundreds of tables with thousands of fields. The open relational structure supports the system's own built-in operational reports and the use of external reporting tools. Marketing Suite applications may share the KnowledgeBase, so all Marketing applications may work seamlessly together.

Marketing Data Mart—In cases where the end user customer does not have an external marketing database, the Marketing KnowledgeBase offers an integrated Marketing Data Mart ("MDM"). At the base of the MDM is the Audience Member entity, which acts as a Customer and/or Prospect Master. A system administrator can extend the Audience Member to support specific user-defined attributes required to describe the customer or prospect. In addition, the MDM allows for the inclusion of customer-defined transaction information such as orders, contact history, response history and accounts. The embedded Marketing Data Mart tables can all be loaded from external sources using Data Source Management tools for extracting, matching and merging external data sources into the MDM.

Many marketing organizations today have invested heavily in their own marketing data infrastructure including developing their own marketing data marts. These data marts consolidate marketing data from multiple data sources using the organization's business rules, aggregations and definitions. They are designed and tuned specifically to support marketing segmentation and analytics. To take advantage of this valuable marketing resource, the Marketing Campaign Manager can access and segment against one or many external marketing databases.

A system administrator or power user defines the connections to the external marketing databases in CM database list view. The administrator has the option to make the entire marketing database available, all tables and all fields, or define a subset of tables and fields to make available to the marketers. This is especially useful when there are specific tables that the marketer needs versus seeing all of the data and becoming overwhelmed. This feature can also protect customer privacy, allowing a system administrator to hide specific fields like Social Security numbers, unencrypted account numbers, credit scores or other personal information.

Figure 10:
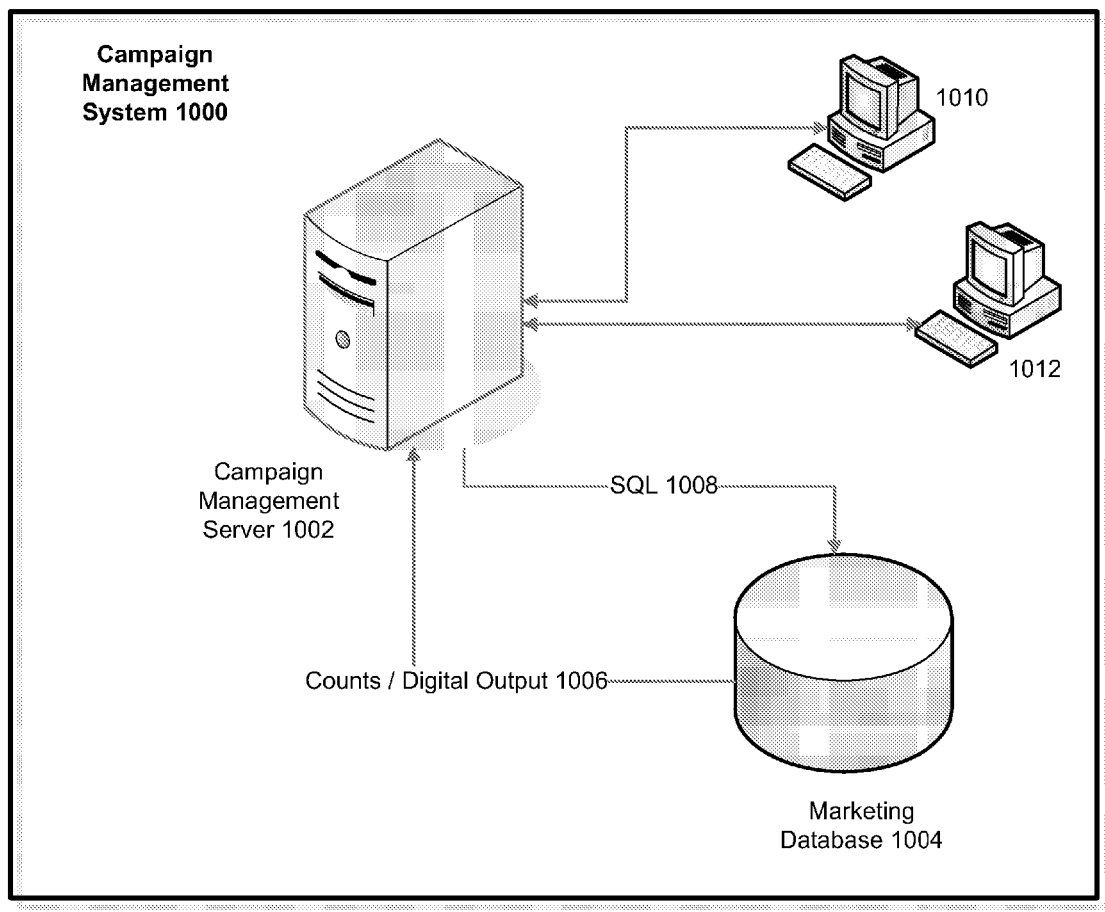
FIG. 10 a schematic diagrammatic view of an enterprise marketing data system according to one embodiment of the present invention.

FIG. 10 shows Campaign Management System 1000 having Campaign Management Server 1002 and Marketing Database 1004. Campaign Management Server 1002 communicates SQL jobs 1008 that are defined as part of a CM Segmentation connected to a Universe(s). A Universe is a logical model of the marketer's data. The Segmentation service function ships all data processing to the database server and returns via output 1006 counts and/or other information, e.g. where the result is a flat file or email. The results from output 1006 may be viewed from client devices 1010 or 1012.

With Campaign Management System 1000, marketers may dynamically interact with very large marketing databases from a selection of vendors including DB2, Oracle and SQL Server. System 1000, in this exemplary embodiment, uses native database connections to DB2, Oracle and SQL Server through ADO.Net. Native connections deliver the fastest performance because the database interpreter has built-in support for the incoming SQL statement.

Since CM 1000 ships data selection, sorting and processing to server 1002, CM server 1002 generates SQL optimized for each vendor and function to deliver the best query performance. To deliver optimized, native SQL, server 1002 includes a centralized SQL generator with extensible syntax dictionaries to manage the formation of all database requests. The CM users may define SQL extensions to the dynamic SQL within a Universe to add hints and connection attributes, as well as post SQL statements to perform tasks such as generating indexes and updating statistics.

System 1000 delivers an innovative way to improve campaign segmentation performance and reduce normally intensive CM segmentation performance. Server 1002 includes software for building and executing most queries to the underlying marketing database as counts. Count queries run with reduced resources in comparison to other campaign management systems that return and store sets of ids or keys, called tag tables or tag files. The typical tag table creation process requires a series of steps including: the creation of a database table; running the SQL to return the result set of records; sorting the returned data; and inserting the sorted data into a temporary table. In contrast, the typical count query runs the SQL and returns a count. Returning and storing actual data like keys in tag tables when the major concern is cell counts is often unnecessary and a waste of a lot of database processing cycles. Server 1002 limits the creation of tag tables.

Server 1002 also intelligently reviews a campaign segmentation and combines count and selection criteria for multiple cells into one SQL statement that returns an array of counts or data. This capability allows server 1002 to take a campaign segmentation that may have hundred of nodes within it and resolve these cells in just four or five SQL statements. Server 1002 thus dramatically reduces the number of database queries sent to database 1004 and the amount of work database 1004 is required to perform. Other systems will often execute queries for each node or cell individually, which may mean hundreds of queries executing against the database versus just a handful. A handful of batched queries may scan the underlying database tables fewer times and take much less execution time and use less database resources then submitting hundreds of individual queries.

Figure 11:
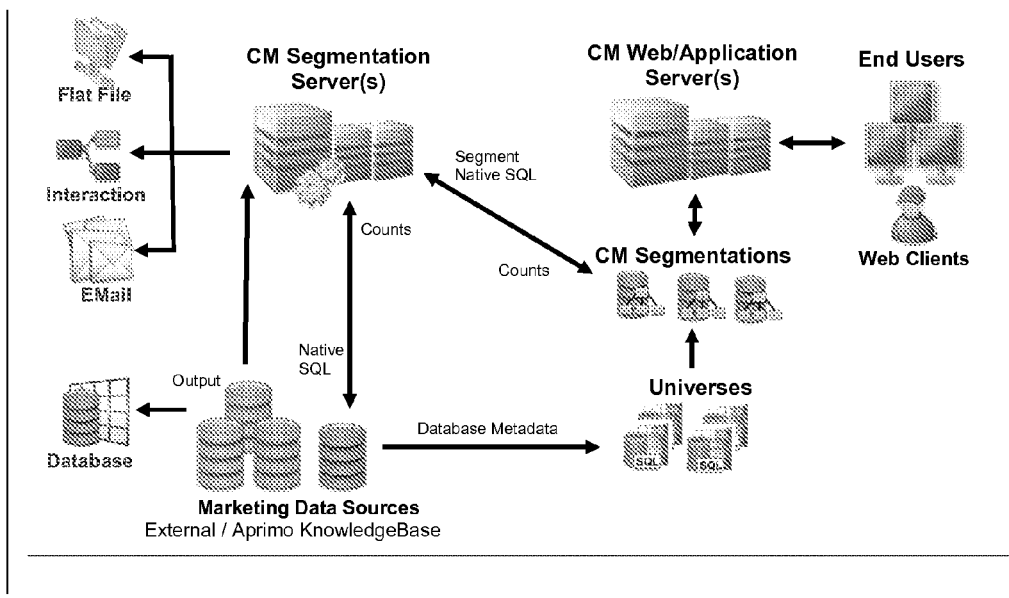
FIG. 11 is a schematic diagram of a selection operation according to one embodiment of the present invention relating to customer data.

FIG. 11 shows system 1000 traversing a CM segmentation and combining cell criteria into as few SQL queries as possible. The above example shows 10 cells that will run in one SQL statement in Aprimo CM. Server 1002 greatly reduces the number of queries submitted to the database, which lowers the database resource requirements, and significantly improves campaign performance.

Finally, server 1002 also consolidates the creation of tag tables when a group of customers must be divided into a matrix of nodes. Often, in the case of deduplication, deciling and offer assignment before output, the campaign management application must generate a number of output nodes, not just one. Server 1002, where possible, does not generate multiple individual tag tables, but instead creates one tagged table. For example, instead of creating 100 individual tag tables, with 100 create table statements, 100queries, 100 sorts and 100 inserts into those tag tables, server 1002 combines those into one tagged table that executes just one create table, one selection query, one sort and one insert. This innovative process significantly reduces the query overhead to the database and it dramatically decreases campaign execution times.

System 1000 presents marketing data to the marketer within the concept of a Universe. A Universe is a logical view into the external marketing database, similar to what many business intelligence and reporting tools use today. This logical view hides the physical structure of the data and replaces it with a more user-friendly view of the marketer's database. A Universe contains the audiences (i.e., customers, accounts, etc.), entities (tables), attributes (columns), relationships (relations between tables), and calculated attributes (calculated columns). A Universe can take a highly dimensional data model with numerous tables, fields and table joins and present a flattened data model to the marketer with an intuitive list of fields grouped by subject areas or business categories. This capability is a useful feature for system 1000 versus many other campaign management applications that make the marketer navigate the physical data structure and traverse multiple tables to find the needed fields.

Figure 12:
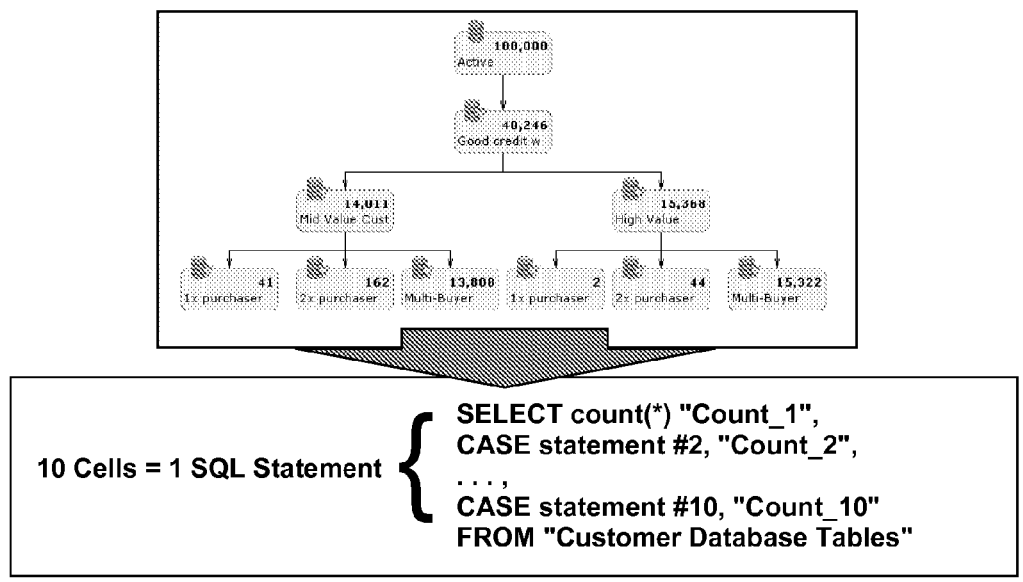
FIG. 12 is a flow chart diagram of the operation of the present invention relating to a flat organizational user view.

FIG. 12 shows a Universe presenting a complex marketing database structure in a flat logical view that is easy for the marketer to navigate. The software of server 1002 may also include dynamic aggregated and calculated fields to perform complex functions without the user having to understand the underlying logic.

An administrator or super user can extend the Universe to offer calculated fields that encapsulate complex business logic, aggregates and even raw SQL into the logical view. This allows marketers to use complex logic within the context of their data model without having to understand the encapsulated logic. These fields look like any other database field in the Universe but they dynamically build their values depending on the formula. For example, in order to manage contact management rules the marketer must first determine the number of promotions sent to a customer in the last three months. This requires an aggregate calculation, a sum of the number of contacts for each customer. In system 1000, the administrator or super user can define the aggregate field to calculate the number of contacts per customers and present that field as part of a Universe, as if it were just any other database field. When the marketer needs to perform a segmentation or suppression based on the number of contacts made to a customer, they would just use the calculated field in their selection criteria. The field dynamically calculates the number of contacts in real-time when the query executes to determine the result.

Multiple Universes may map to the same marketing database, with each Universe designed for different marketing campaign management users or user groups. A Universe, as an object to the software of server 1002, has embedded security rights to allow only certain users or user groups to access it. Universes can include a global filter to isolate the Universe to specific portfolios of customers like business unit customers, customers by status (lapsed, current, pending etc.), product category purchasers or high-value customers. A Universe filter can also exclude customers that are on the corporate suppression list, do-not contact lists, defaulted customers, and/or inactive customers. In summary, a Universe can deliver a specific type or profile of customer with the corporate suppressions pre-applied before the first segmentation ever runs.

Test and Production Switching—A Universe can switch between multiple underlying marketing databases that have a similar data model. This database switching feature supports implementations with a development/test sample database and a production database. This database switching capability facilitates campaign development and testing against a smaller sample database before running against production data. For example, by using a test database, which consists of a 5-10 percent sample of database 1004, the marketer can more quickly execute and test segmentation schemes. When the testing is complete, with a simple toggle in server 1002, the same campaign segmentation can run "live" against the full data set of database 1004. This database switching capability eliminates having to export and import campaign segmentations from test environment to production environment.

Static Universes—Static Universes are the equivalent of mini marketing data marts that accelerate campaign query performance. Universes are logical or business views into the underlying marketing database. A Universe maps multiple tables and fields into one logical flat view of the marketing data. This logical flattening of the data model may become physically flat using the Static Universe feature. Static Universes filter, pre-aggregate, combine and calculate fields from multiple tables in the marketing database and store all the data in one table. This consolidation of data attributes allows campaigns to execute more quickly against the pre-calculated Universe, because most of the resource intensive work has already been executed with the Static Universe build or refresh. System 1000 may schedule Static Universe to refresh on a recurring basis (e.g., nightly, weekly or monthly) and initiate automated campaigns once the static universe completes their refresh.

Campaign Management systems require scalability across a number of dimensions: number of campaign users, marketing database size and campaign segmentation size. The architecture of system 1000 scales across all these dimensions. It scales to manage large user communities, large marketing databases and campaigns with a few segments to hundreds of segments.

System 1000 scales to manage large user communities and heavy transaction environments. Legacy campaign management systems have normally served only a handful of campaign developers at a time, while system 1002 is designed to support an entire marketing organization across divisions and locations, for example via connections to client terminals 1010, 1012. To deliver this superior scalability, system 1000 may deploy across multiple Web Servers, across multiple Segmentation Services servers and may be tuned to utilize the full resources of each server.

Figure 13:
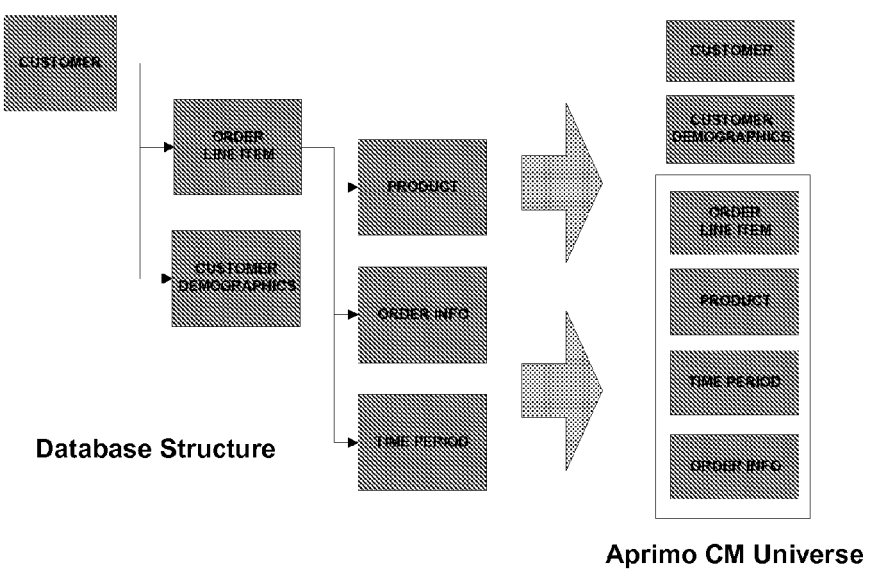
FIG. 13 is a schematic diagram of an organization of servers implementing one aspect of the present invention.

FIG. 13 shows system 1000 architecture supporting clustered servers at both the Web Application tier and the Segmentation Services tier. This allows system 1000 to manage large user communities and heavy campaign management workloads. Thus, Campaign Management Server 1002 may include the web, business and data tiers which may deploy across a web server farm to meet failover, high availability and load balancing requirements. As a feature of the EMB architecture, all applications on server 1002 are easily clustered because each has been designed to run "stateless" and does not require the management of a session across servers, commonly referred to as a "sticky session." Because of the application's stateless operation, system 1000 may support numerous clustering schemes including hardware load balancing or the Windows Load Balancing Service (WLBS).

Figure 14:
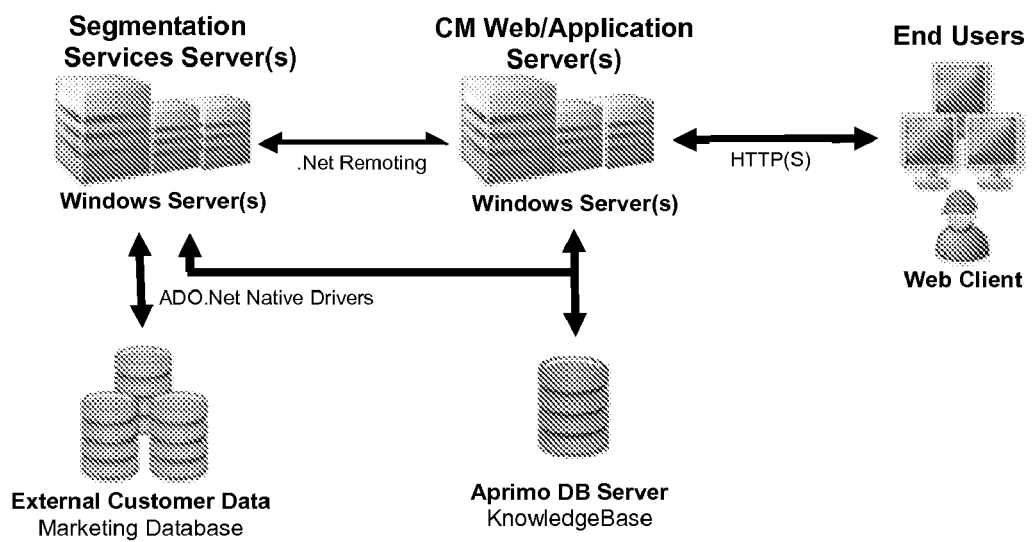
FIG. 14 is a screen shot diagram of the view segmentation designer of one aspect of the present invention.

The Segmentation Service of server 1002, as well as other Marketing Services of server 1002, is multi-threaded and can be replicated and deployed across multiple servers to scale to handle hundreds of database queries and millions of records. A central master scheduler service packages and distributes the SQL jobs across multiple segmentation services. This provides native clustering for the services, allowing the SQL jobs from one campaign segmentation to execute across multiple Segmentation Services across multiple servers. Because of the demands on the Segmentation Service, the ability to deploy multiple, multi-threaded services across many physical servers delivers increased application performance and reliability. The number of execution threads is configurable to fully utilize, but not exceed, the allocated server resources—processors and memory. An example of a view of segmentation is provided in FIG. 14.

System 1000 scales across the other performance dimensions including database volume and campaign size. System 1000 may support large marketing databases and large segmentation schemes of hundreds of nodes using a couple of features. First, by implementing the Segmentation Service as a thin application server, it does not transfer data or perform any data processing on the application server. This eliminates any performance issues based on network bandwidth or the application server resources, and keeps segmentation processing all on the system best suited for performing data processing, the database server. Secondly, server 1002 baskets multiple segmentations into one SQL statement, reducing the number of queries sent to the database server and the database resources required to execute a campaign. In comparison, legacy campaign management systems often have to pull down and process millions of records on the application server and over run the underlying database server with hundreds of individual queries, one for every cell.

Server 1002 may also include an Enterprise Marketing Backbone (EMB) which delivers an extensible and modular platform that is highly configurable. EMB may take advantage of this configurability to change business terms, change business rules, add fields, add a list of valid values, add tabs etc. The base field names delivered with the application can be relabeled to match the marketing organization's business terms. Each core application object (e.g., marketing activities, tasks, budgets, invoices etc.) allows the addition of user-defined fields or extended attributes with an associated list of values. Each component can have business rules associated with it regarding access, attribute contents, approvals and other elements.

This extensibility and flexibility allows system 1000 to fit the marketer's needs and creates one common set of terms for the marketing team. This exemplary configuration is accessible, usable and manageable. Further configuration tools on server 1002 allow non-programmers to configure the application. In fact, performing the configurations listed previously—such as changing terminology, extending objects with user-defined fields, adding user defined views and tabs and adding business rules—may be a part of the basic, "out-of-the-box" functionality of system 1000. This rich assembly of configuration options is fully supported and can be maintained across upgrades and patches.

Marketing departments should no longer accept being isolated from other systems. Significant productivity gains can come with the integration of marketing operations to internal fulfillment, sales, production and financial systems as well as integration with external vendors and customer facing systems. System 1000 provides integration points to external systems.

Within server 1002, an Agent tool allows integration between the campaign and external executables. The Agent tool may be placed anywhere in the Segmentation scheme and when initiated it will run external programs, scripts, database stored procedures and ftp processes. The Agent tool may deliver a range of custom capabilities including sending output files to vendors, dynamic scoring of data, record coding and other external operations.

Outside of the ability to call external programs for use within a CM Segmentation, there is also the capability to pass campaign metadata like offer, campaign and other information from system 1000 to external systems and back. Server 1002 uses the Enterprise Marketing Backbone infrastructure that includes an integration layer, the Integration Workbench. The Integration Workbench facilitates the bidirectional exchange of data using open web services based on industry standard XML, SOAP, and WSDL protocols. The implementation of web services within system 1000 is programming language neutral. It does not include any proprietary attributes or extensions, allowing system 1000 to integrate with a variety of systems that offer a web services interface, including J2EE, legacy mainframe, C or other programming languages. The Integration Workbench has been used to integrate with Siebel, SAP, Oracle Financials, Documentum and other systems.

Server 1002, being a true web application, may deploy to users outside of the local network or VPN. Having a number of remote users often requires that information be transmitted over the internet. Server 1002 may support HTTP over SSL (i.e., HTTPS) to protect data sent over the internet. HTTPS combines normal HTTP interaction, serving web pages, over an encrypted secure socket layer (SSL). HTTPS encrypts web page content so that only the authorized recipient is able to decrypt the content.

System 1000 also provides a number of additional security features to harden it against unauthorized access, hacking and other security threats. Such applications, including CM, require user authentication via login or Single Sign-on authentication. During user login, the application generates a time-stamped security token. This security token authenticates at each tier (the web, business, and data tier) to prevent intercepting and tampering with messages. Another common attack is to tamper with or hack a web applications encoded URL or to attach malicious code like a script to a URL. To prevent URL attacks and more precisely Cross Site Scripting attacks (XSS), server 1002 validates its own encoded URL. The data type and length of the URL parameters are confirmed and all user-entered data is formatted in HTML.

Single Sign-on Support—Single Sign-on ("SSO") allow users to enter system 1000 without prompting for a user ID and password and instead accepts authentication from a third-party directory or authentication server. An SSO API allows user authentication using third-party authentication including active directory, lightweight directory access protocol ("LDAP"), SiteMinder and other callable authentication systems. Aprimo Marketing supported SSO mechanisms to pass authentication includes query string parameters, cookie values, http Header or server environment variables.

Security Model—Besides enforcing application access for each user and authenticating the user with a security token across tiers, system 1000 may support access rights at the module, functional and object level to a specific user or group of users. Module rights determine what application modules a user or group can access. Functional security controls what functions the user or group can perform in those modules. There are generally two assignable functional rights—view and edit. View allows read-only rights where edit provides the ability to add, modify and delete rights. For objects in system 1000, such as a Universe, Campaign or Offer, the user can define an access list to limit which users can view or edit each object. This provides a very high degree of access security granularity driven to the individual object and user level. A system administrator can even define business rules that automate security rights to objects. For example, when a user creates a new campaign, a business rule can set the access list to allow only the user's group full access to the campaign.

Marketing today is global and the marketer's applications must be global as well. System 1000 is a true global application. It supports querying against international marketing databases. System 1000 also supports the localization of the user interface at clients 1010, 1012 for a multi-language user community. System 1000 may access, query and generate output from Unicode/double byte databases. Unicode databases can support a range of language encodings for most every written language in the world. An administrator can define a CM Universe to a specific subset of marketing data, partitioned by local language, and access given to the local marketing team. These Universe capabilities coupled with Unicode database support makes a global campaign management deployment much easier.

System 1000 screens and views include localized language packs, for example having English, Japanese, French, German and Spanish (Mexican). This allows system 1000, from a single implementation, to support multiple languages based on the user preference. Individual user preferences specify the language of the user interface. For example, a marketer in France may view a user interface on client 1010 or 1012 in French and query their French Universe. An associate in Japan for the same company may view the same screens in Japanese and the vice president of product marketing in the U.K. may use the same system in English to pull local U.K. lists. Even user-defined fields and pick lists of values can be encoded to support multiple languages. In addition, each marketer may track their marketing budgets in their local currency, while the accounting integration may track and record spending in a common currency, e.g. in Euros or US dollars.

Server 1002 uses common industry-standard tools and technologies. This approach ensures a reliable and open technical infrastructure. The underlying technologies include:

- XML—Defines a graphical user interface and SOAP based integration interface
- Web Services—Aprimo, leveraging the power of .Net, provides an Open Web Services interface to Aprimo Marketing application objects. Integration Workbench supports language neutral interoperability based on industry standard SOAP, Web Services Description Language ("WSDL"), and Universal Description, Discovery and Integration ("UDDI") protocols.
- Microsoft Net—All tiers in Aprimo Marketing have been developed using the .Net framework. Its rich feature set provides a robust environment for delivering Enterprise software that is reliable, scalable, and interoperable.
- Microsoft Internet Information Server (IIS)—Microsoft IIS manages requests for web pages and passing HTML responses back to the client.
- Active Server Pages (ASPX)—Aprimo Marketing uses active server pages ("ASPX"), an entry point to .Net objects.

Having a campaign management application to target customers, associate offers, track promotions and generate output lists requires integrated reporting to better manage these programs and to learn from each effort. Database 1004 may include a KnowledgeBase is stored in an open relational data structure. The KnowledgeBase model or entity relationship diagram ("ERD") is published. This open relational database allows direct access to the Marketing KnowledgeBase using reporting modules, tools provided by various software vendors, or company specific business intelligence reporting applications.

Aprimo offers 70 standard reports to track information available across the various Aprimo Marketing modules including Campaign Manager. Aprimo Marketing has integrated with Crystal Reports® to support operational reporting. A sample of standard operational reports includes project, activity, utilization, forecast versus actual, interaction summary, lead deals revenue, jobs by category and budget reports. Aprimo Marketing also provides the ability to export data from list views directly to Microsoft Excel® or any other spreadsheet application for further manipulation and formatting. Aprimo or its partners commonly assist with or perform report modifications and development for Aprimo customers.

Figure 15:
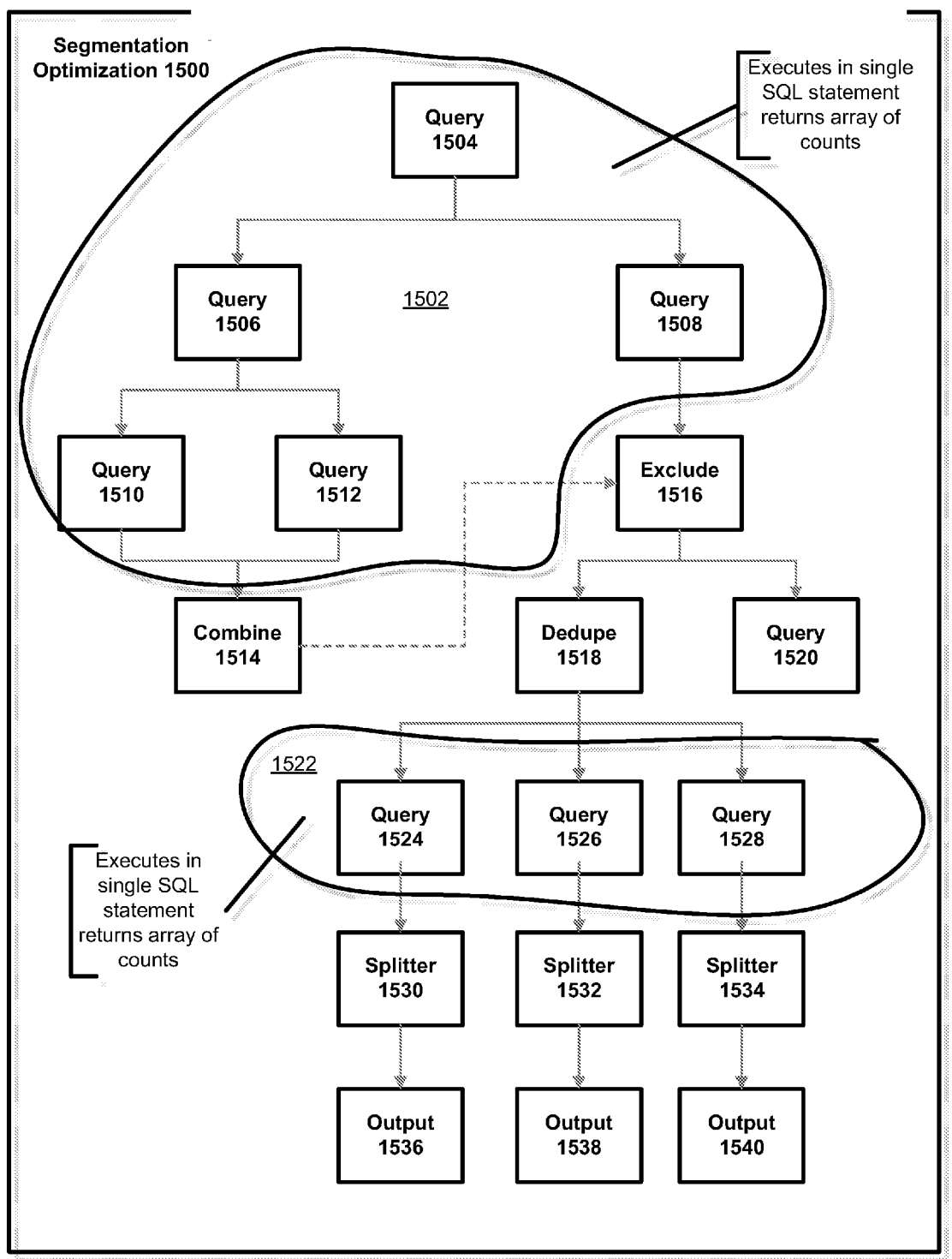
FIG. 15 is a schematic diagrammatic view of a segmentation implemented according to an embodiment of the present invention.

FIG. 15 illustrates an embodiment of the system of the present invention. To improve campaign management segmentation performance, server 1002 scans across an entire segmentation as shown as segmentation optimization 1500 and determining which processing nodes 1502, 1522 may be concatenated and run together. The nodes that qualify for a concatenation must satisfy a number of criteria. This criteria includes but is not limited to perform similar processes, query against the same database, and be directly connected. By similar processes, only nodes of compatible or similar operations can be combined into a single SQL statement. This means that the type of processing must be similar—the same database must be used for query criteria, the same sort defined, the target record key consistent across segments, and the result set must be of similar type (e.g. a count or an array of fields). The term "directly connected" is defined that the segments must be either a parent segment or some level of child segment without a break between relationships. Breaks are caused when a node cannot run in concatenation with other nodes because it is not of like type, processing, or results. A break implies that a segment must calculate after the combined node grouping for concatenated SQL. In this exemplary situation, nodes 1504-1512 are concatenated and at combine 1514 joined together for delivery to exclude 1516. At this point, dedupe 1518 may result in several concatenated queries 1522 including queries 1524-1528, or a separate query 1520 may be run. Finally, splitters 1530-1534 may be created and sent to ouputs 1536-1540 for final disposition.

Figure 16:
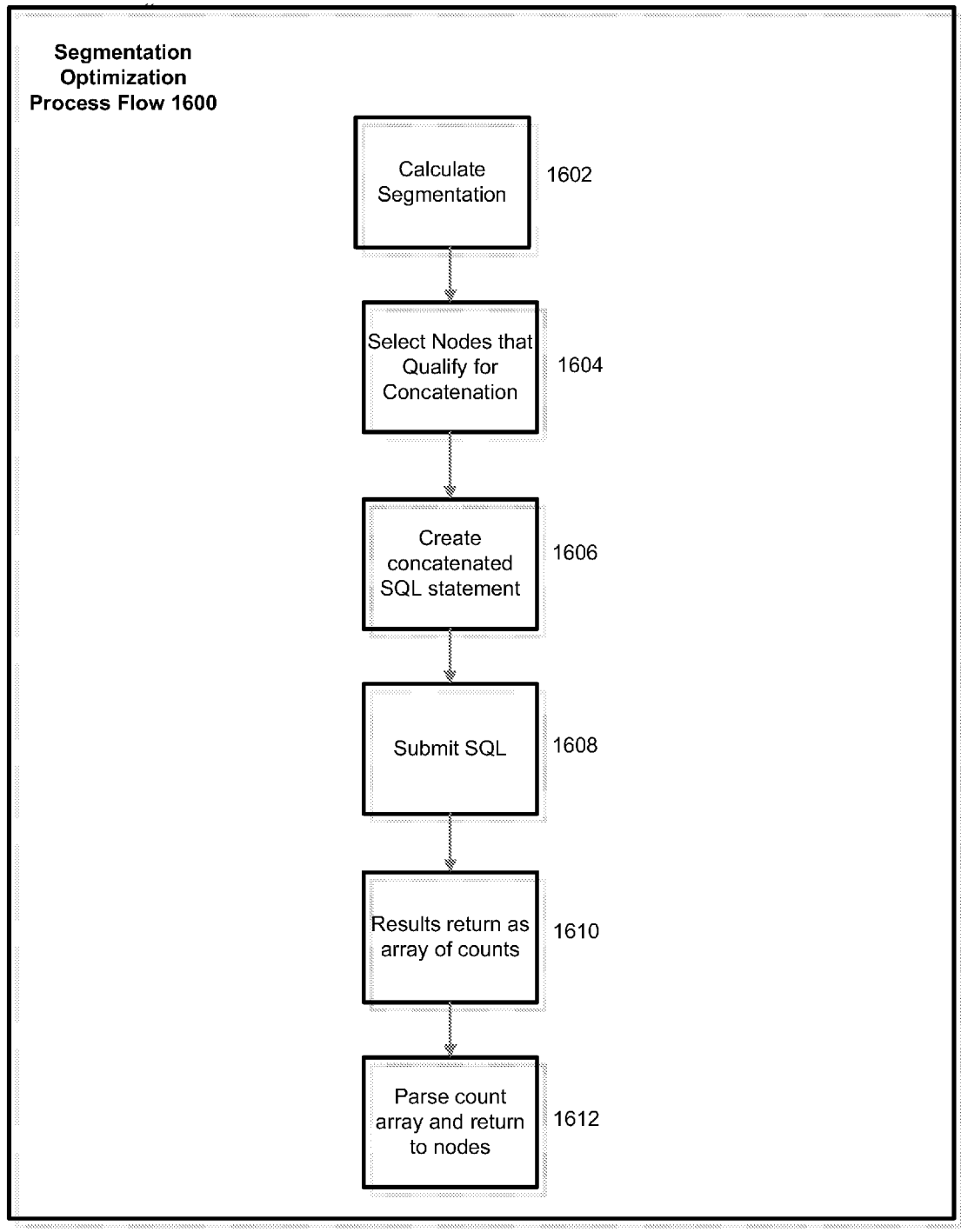
FIG. 16 is a flow chart diagram of the segmentation optimization method of one embodiment of the present invention.

A segmentation may have multiple groups of nodes that qualify for concatenation, separated by nodes that do not qualify for concatenation, as determined by steps 1602, 1604 of Segmentation Optimization Process Flow 1600 of FIG. 16. When the campaign segmentation starts running and submitting SQL to the database, the concatenated nodes will process within the segmentation tree in the proper run sequence. The qualifying nodes instructions and criteria are turned into SQL statements and the statements concatenated together in step 1606. The queries and processes are concatenated using a number of different database functions including, but not limited to, case statements, inline views, and stored procedures. The concatenated SQL statement is structured in such a manner to return an array of results in step 1608. These results can be a set of counts or a set of fields and records. The results are tagged with a segment id to map to the appropriate segment and node to the proper results. The concatenated SQL is then submitted to the database. Database 1004 executes the concatenated SQL and returns an array of tagged results to the segmentation in step 1610. The results are parsed according to the appropriate segment tags and associated with the specific segmentation node identified in those tags in step 1612. The results array is parsed in memory and applied to the appropriate nodes to update the segmentation user interface and the stored segment data attributes. The interface on client 1010 may show counts representing a completed segment run on the user interface segmentation. This allows the user to determine the records that qualified in the segments for further processing.

This segmentation performance optimization allows the resolution of multiple segments in a segmentation using just one SQL query. The user still receives all the necessary segment counts back to the segmentation user interface. Subsequent queries will then initiate. In known systems, each segment node would run independently with each segment having a separate SQL statement and often its own segment temp table. This economical application of SQL to resolve many segments at one time reduces database overhead and reduces the total processing time.

Figure 17:
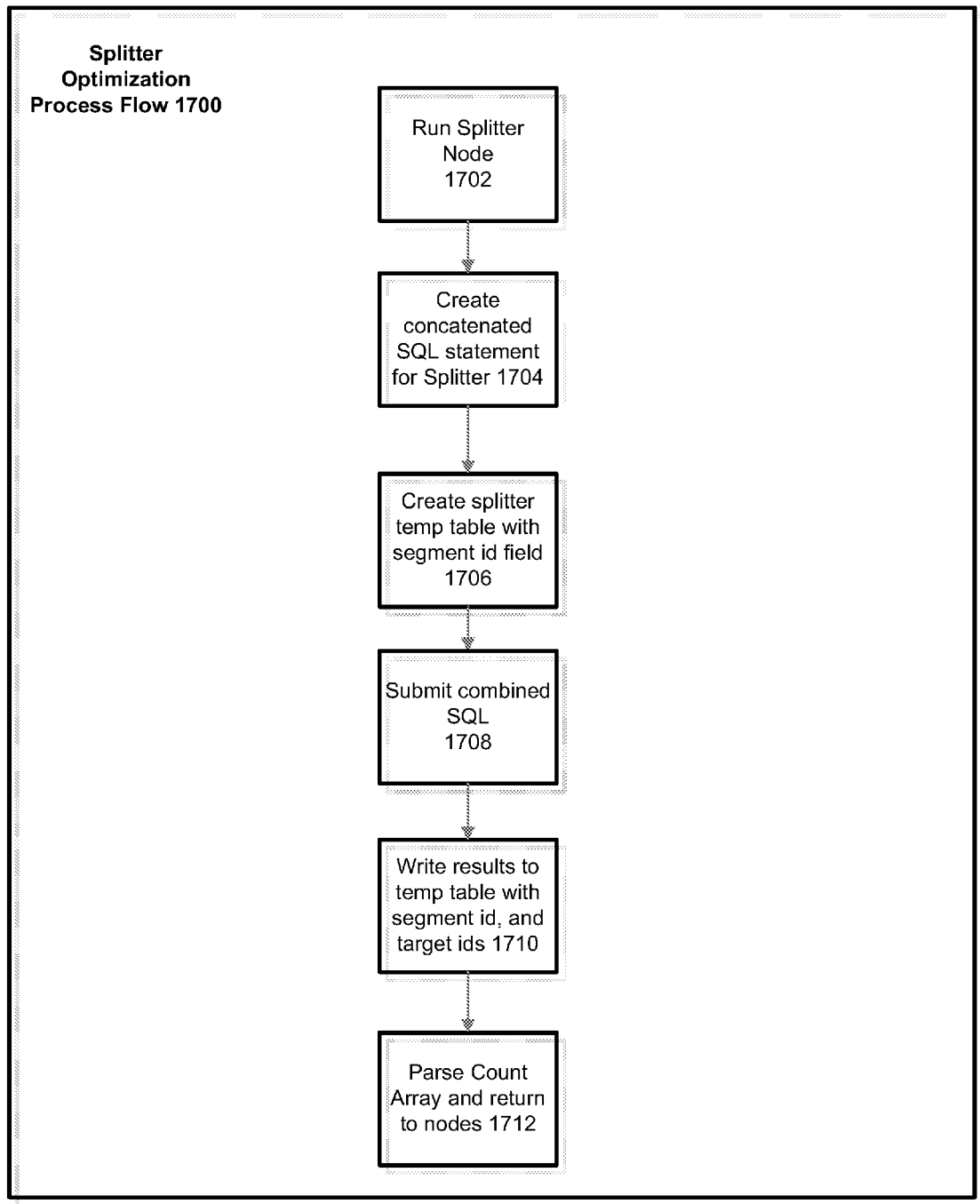
FIG. 17 is a flow chart diagram of the splitter optimization process of one embodiment of the present invention.

FIG. 17 illustrates another embodiment of a method of improving campaign management segmentation performance. In Segmentation Optimization Process Flow 1700, system 1000 scans across a segmentation to find all splitter nodes. Splitter nodes produce multiple segments. A splitter divides target records from a parent segment into multiple child segments based on a combination of criteria (queries) and sorted order or random sort order into any number of nodes or cells. When the campaign segmentation starts running and submitting SQL to the database, the splitter nodes will process within the segmentation tree in the proper run sequence. The qualifying splitter instructions are turned into SQL statements and the statements concatenated together in step 1702, 1704. A qualifying splitter may be a splitter node with processes that can support concatenation into a single SQL statement. The segment processes may be segment queries, segment sorts and splits, or special sorts and splits. The queries and processes are concatenated using a number of different database functions including, but not limited to, case statements, inline views, and stored procedures. The concatenated SQL statement is structured in such a manner to return an array of results to insert into a tagged table within the database.

Figure 18:
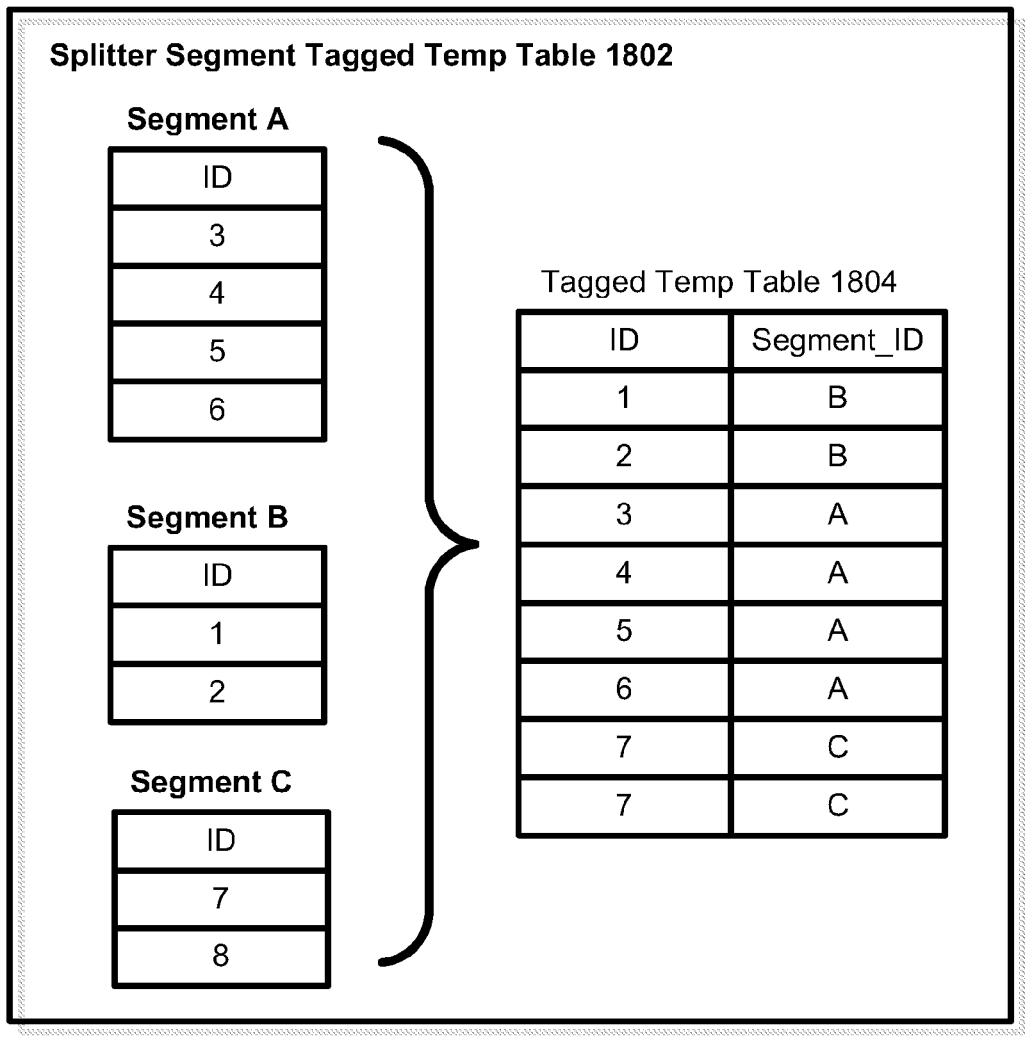
FIG. 18 is schematic diagrammatic view of a splitter segmentation temporary table according to one embodiment of the present invention.

Referring to both FIGS. 17 and 18, tagged table 1804 includes a field for the target record key, this could include but is not limited to customer_id, individual_id, and account_id, along with an id to identify the underlying splitter segment. This design, of target record key and segment id, allows for a single SQL and table insert statement to populate results for multiple segments. First, the tagged table create statement is created and submitted to the database in step 1706. Subsequently, the concatenated SQL is then submitted to the database in step 1708. The database executes the concatenated SQL to insert multiple segment results into the tagged table in step 1710. The tagged table is referenced directly to generate segment counts for each split in the interface in step 1712. The segments can be manifested to the interface in individual visible nodes using a single SQL statement to return an array of counts for individual segment. The tagged table can then be used for output and other child node processing.

This allows the resolution of even hundreds of segments in a splitter into one SQL query all inserted into one tagged table. In known systems, each result set or segment would have its own SQL statement and its own segment temp table producing hundreds of queries, many more than the number of segments. This economical application of SQL to resolve segments reduces database overhead and reduces the total processing time.

Figure 19:
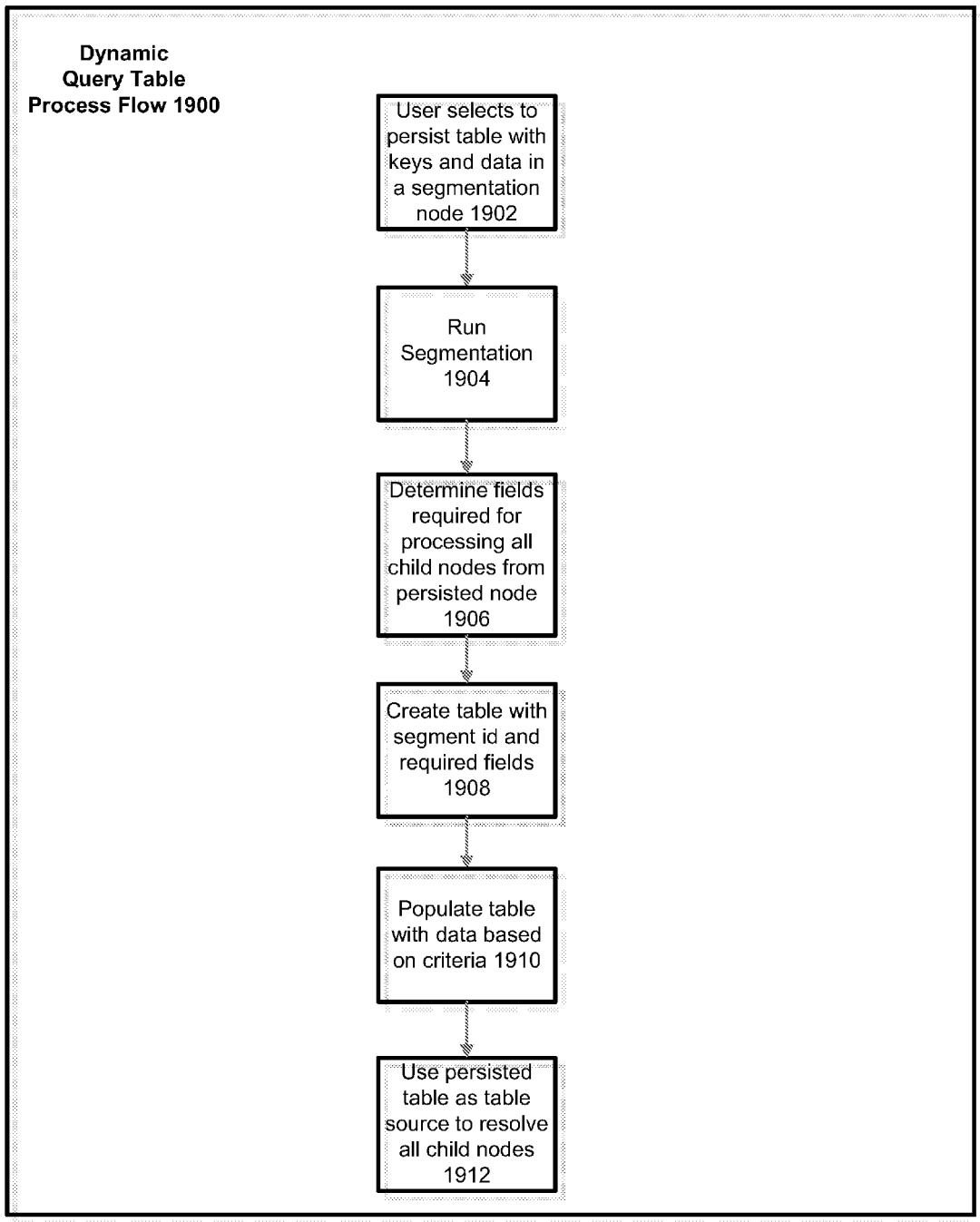
FIG. 19 is a flow chart diagram of a dynamic query table method of one embodiment of the present invention.
Figure 20:
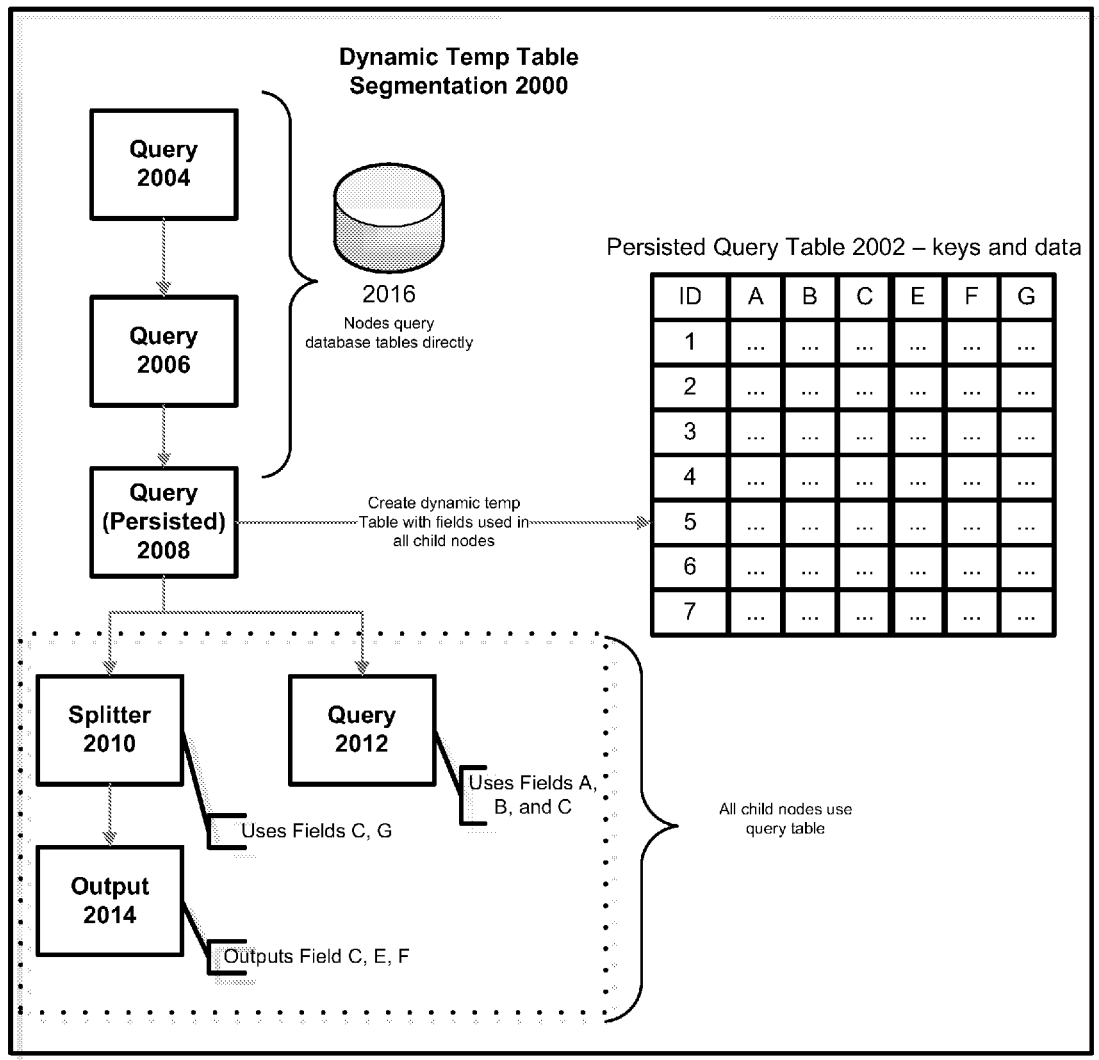
FIG. 20 is a schematic diagrammatic view of dynamic temporary table segmentation according to one embodiment of the present invention.

Referring to the embodiment of the present invention depicted in FIGS. 19 and 20 for improving campaign management segmentation performance, system 1000 supports dynamic temporary (temp) tables. It is not uncommon in campaign management applications to pull intermediate tables of ids or keys and data to speed downstream query performance. The problem with these other systems is the manner in which it is done is as described in the Dataset node section of the Patent Summary. Normally, the product of a Dataset node produces temp tables with keys and data. The Dataset node requires a user to define what fields to extract as well as to manually map the fields into the campaign management system to make them available for selection.

As an enhancement to system 1000, segmentation 2000 provides dynamic temp table 2002 to be applied to any segmentation node with a set of initial fields to include or no fields specified at all. In the exemplary configuration, queries 2004 and 2006 access database 2016 directly, as does persisted query 2008. However, as the user applies child nodes splitter 2010, query 2012, and output 2014 to the segmentation after the dynamic temp table node, dynamic temp table 2002 automatically updates to include the fields defined in those child nodes. The user may pick any available database field without having to manually update temp table 2002 or remap temp table 2002 into the campaign database metadata.

To initiate dynamic temp tables the user specifies which node to apply the dynamic temp table in step 1902 of process flow 1900. From this node on now, as the user selects fields for query node criteria, splitter segments, for sorts, for output, and any other purposes, those fields will become part of the definition of the dynamic temp table. The temp table will not execute or build at this point, but the definition will keep changing as fields are added and dropped in downstream node.

Dynamic temp table 2002 node will run in the sequence of operation of nodes within the segmentation at step 1904. The temp table node and all parent or previous nodes will execute normally against the database tables directly. When the order of execution comes to the node with the dynamic temp table, the node will create the temp table in the database with all the fields necessary for any subsequent queries in step 1906. The node will then read all these fields from the various tables and write them to the temp table in step 1908. Dynamic temp tables will write only qualifying rows that meet the specified criteria.

All child nodes to the dynamic temp table node will now use the temp table to resolve their processing or queries—including but not limited to all query, splitter, dedupe, and output tools. The subsequent nodes typically resolve much more quickly working from a subset of data. As child nodes to the temp table node are modified, adding new fields and dropping old fields, the definition of the dynamic temp table changes. Upon submitting the segmentation again to run, the previous temp table will be dropped and the new table structure created. The node will then submit the necessary SQL to populate the temp table. Then subsequent segmentation nodes will execute against the newly defined and populated table.

Dynamic temp tables do not require the pre-selection of fields to extract, do not require mapping the dynamic temp table into the campaign management system, and allow the user to continue to work and redefine nodes without having to actively manage the temp tables. This delivers the performance benefit of Dataset nodes to pull subsets of the database such that subsequent segments will only have to query one smaller table (fewer fields and fewer rows with few to no joins) to resolve all qualifying target records. Dynamic temp tables can dramatically increase performance while eliminating manual user configuration and maintenance of the temp table.

Figure 21A:
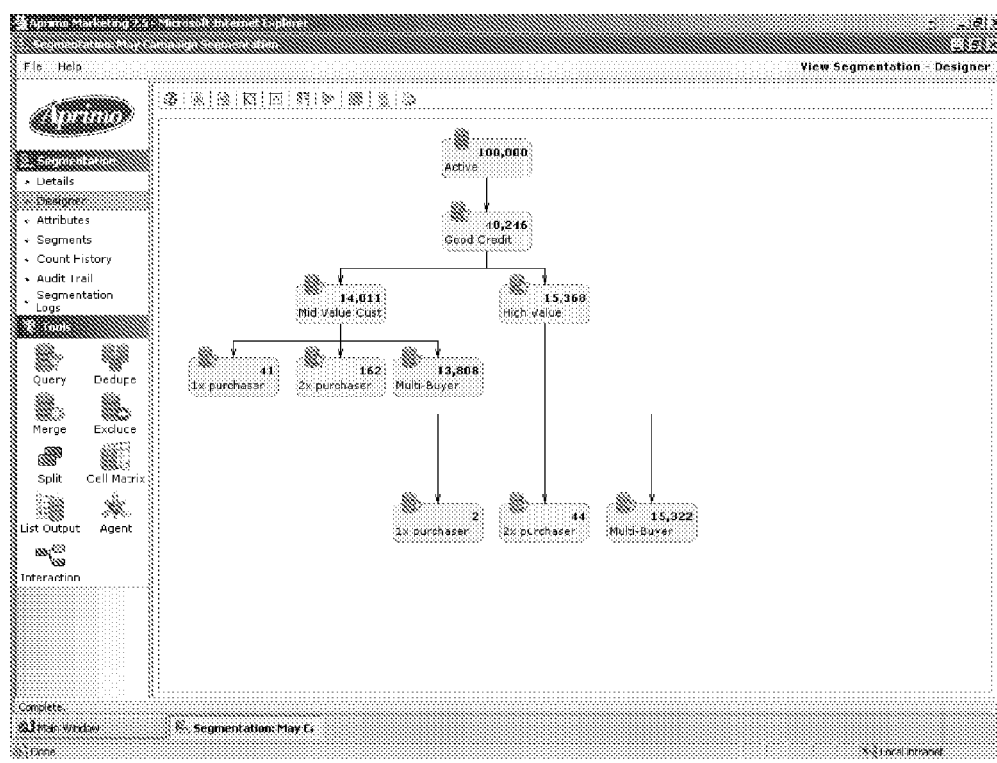
FIGS. 21A and 21B are a screen shot diagrams of the workflow designer of one aspect of the present invention.
Figure 21B:
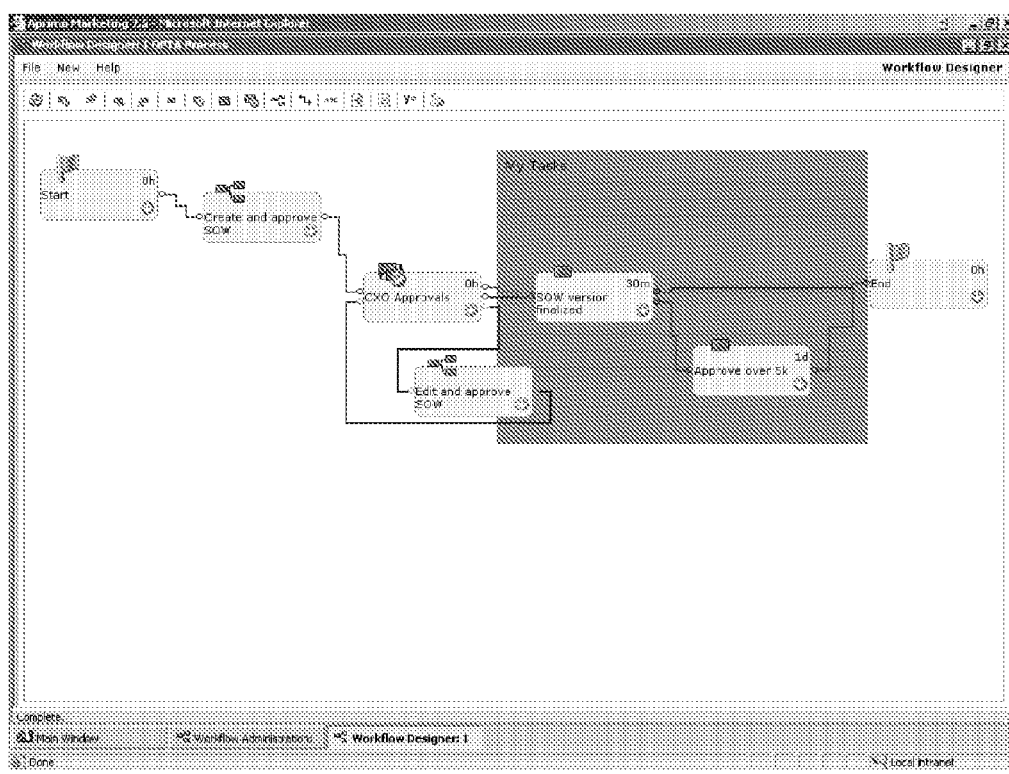

An example of Workflow is shown in FIGS. 21A and 21B. Workflow is the automation of a business process, during which documents (information, issues, tasks, work orders, bug/defect reports etc.) are passed from one state to another for action, according to a set of rules defined by your workflow scheme. Aprimo has developed a workflow solution that is flexible enough to manage the way marketers work and the way they want to interact with their projects. A workflow template is a set of work tasks to perform and is hierarchically grouped and linked together to establish the flow of work. A web user interface allows the user to graphically place these work tasks in the proper order, including the roles to complete the work, the amount of time needed to complete the task and the work effort involved. Once the workflow template is drawn, the template is uploaded into a repository for use. There is a web user interface to associate the workflow template to a job. This generates a project schedule for that job and enables the users to complete work tasks through a web interface, based on the order in the template.

One embodiment of the present invention involves an open and scalable Enterprise Marketing Backbone ("EMB") that deploys across four logical tiers: web, business, services and data. These tiers and services can deploy across one or many physical servers to scale to support any size marketing user community via the web.

Web Tier—Composed of User Interface ("UI") objects completely described in XML used to build and deliver the client web pages in HTML and JavaScript.

Business Tier—Consists of a set of objects describing the Aprimo Marketing business attributes. The business tier may expose many of its core business objects as web services to deliver a variety of integration capabilities to external applications.

Services Tier—Provides a set of 18 services that perform computationally intensive tasks in Aprimo Marketing, including data management, email management, scheduling, campaign management and other services. These services are multi-threaded, can be remotely deployed and replicated to scale to manage large implementations.

Data Tier—Manages the pooled database connections and all application data requests. The Data Tier handles transactions to the Aprimo Marketing KnowledgeBase (application data repository) using parameter driven and optimized SQL for superior application performance (i.e., faster page builds).

The EMB of the exemplary embodiment offers superior breadth of functionality, configurability, scalability, connectivity and security. The components and services provide a broad offering of specific business processes and functionality. These objects applied in different sets allow system 1000 to match each marketer's unique needs, processes and information tracking demands.

Flexible—Activate only the applications and functionality needed to tailor applications to specific needs.

Loosely Coupled—Marketing objects/data may be extended to include additional marketing data and are supported in all the user views and application interfaces.

Distributed—Services can be replicated and deployed remotely across multiple physical servers for superior scalability and reliability.

Open interfaces (Web Services)—Marketing objects can be exposed as programming language and platform independent Web Services accessible to other external systems.

Secure—Security is part of every Aprimo Marketing tier: web, business, service, and data tier, and built into each object and web service interface to support application access, functionality, and object security at a granular level.

The loosely coupled service objects extend to support additional, customer specific marketing data without breaking any associated views, interfaces and integration points. The services are remotely deployable which allows applications to scale to meet the needs of a large and dispersed user community, even into the thousands of users. System 1000 may expose these business objects to external applications as Web Services based on industry standard XML, Simple Object Access Protocol ("SOAP") protocols. This open integration allows applications to interact with external applications in any environment including Java 2 Platform, Enterprise Edition ("J2EE"), mainframe, SAP, .Net and with other external applications and middleware. All these capabilities are secure across all tiers—web, business, services, and data tiers, across all exposed web services, and into the database.

Application data is stored in a KnowledgeBase. The KnowledgeBase is the central repository for applications including Planning and Financial Management, Marketing Production Management, Marketing Asset Management, and Enterprise Campaign Management. For companies which do not have an external marketing customer data mart, the Marketing KnowledgeBase supports an embedded Marketing Data Mart ("MDM") and provides a set of data source management tools to manage this embedded mart.

In cases where an existing marketing data mart or warehouse exists, system 1000 connects to these external marketing data sources and marts for segmentation purposes as part of the Campaign Manager capabilities.

System 1000 is a generally web-based application delivered to a client browser without sacrificing ease-of-use or functionality. The interface presents a traditional process flow metaphor with Campaign Management tools generating customer segments or cells down branches of a tree until output. The interface offers traditional "thick client" functions including an icon-based process flow segmentation screen with point-and-click and drag-and-drop features, but delivered to a web browser client using only dynamic HMTL and JavaScript over standard HTTP or Secure SHTTP ports. System 1000 does not require any client downloads, plug-ins, ActiveX controls or applets—which avoids time-consuming downloads, version and installation problems on the client, and security risks.

System 1000 includes Web, Business, Services, and Data Tiers. These tiers can all deploy on one physical server. However typically the Web, Business, and Data tiers are installed on a Web Application server or server farm and the Services tier is installed on a separate Services/Application server or set of servers.

The Web Application server of the exemplary embodiment consists of Web, Business, and Data tiers. The Web Tier maintains and describes all screen elements, the User Interface (UI), in XML files. It parses the XML to build dynamically the appropriate ASP.NET UI objects that generate the HTML and JavaScript to deliver to the web client. This XML-based screen infrastructure provides a variety of customization options. The Business Tier consists of a set of objects describing the business functions including Universes, Segmentations, Offers, Treatments and more. The Business Tier incorporates an open Web Service interface based on industry standard XML, SOAP and Web Services Description Language ("WSDL") protocols. This integration with other external systems using Web Services. Finally, the Data Tier stores and retrieves all objects from the Marketing data repository or KnowledgeBase. The Data Tier manages a pool of database connections that deliver all object requests for applications into and out of the data repository or KnowledgeBase.

The entire platform is generally stateless, so there is no requirement to maintain a persistent connection for a user session, referred to as a "sticky session." With a stateless application, any Web Application Server across an array of web servers or a server farm can service a request from any client session. This allows the application with a hardware load balancer or Windows Load Balancing Service ("WLBS") to operate in a cluster and scale to serve hundreds of users. This clustering capability provides support for High Availability configurations to keep the application constantly up and running across clustered servers.

The Segmentation Service executes the user campaign segmentation flows, node or cell counts, associates offers and treatments, and generates output tables and lists. The Segmentation Service is the modem day, scalable equivalent of the application server. The Segmentation Service is a multi-threaded service that can deploy across one or many servers to fully utilize any one server's resources and the pooled resources of a server cluster. These jobs execute without regard to the client session, so any Segmentation Service can run a submitted job for any segmentation. This allows the Segmentation Service to natively support server clustering and deliver functionality to a large marketing community—not just to a handful of marketing users.

The Segmentation Service may be implemented as a thin application server. It connects to the external or internal marketing databases, generates and submits optimized SQL to resolve the segmentations and nodes/cells, and all that returns from the database are counts and the occasional flat file output list. Data and data manipulation work is function shipped to the underlying database server. This reduces the network traffic of pulling the data back and forth between the application server and the database. It also reduces the application server workload as it fully leverages the power of the database server to perform all data selection, storage, sorting and processing. This type of thin Segmentation Service delivers enterprise capability on Windows hardware because it eliminates this data transfer and processing overhead common on legacy CM systems.

The exemplary embodiment includes a NT Service which manages the execution and scheduling of the segmentation jobs across multiple Segmentation Service agents. The separate execution of the campaign jobs loosely couples it with the client interface. This allows for disconnected execution of the campaign segmentation. Therefore, a marketer can start a segmentation, close the segmentation while it is still running and return later to review counts and output. The NT Service also manages the scheduled execution of Campaign Manager segmentations for recurring and multi-wave marketing programs. Scheduled campaigns may run a segmentation and generate output on a scheduled or recurring basis like a specific date and time or daily, weekly, monthly, yearly, etc. The campaign schedule is persisted in the KnowledgeBase. Thus, in cases where the application server or database goes down, the NT Service will automatically run the scheduled campaigns stored in the KnowledgeBase once service returns.

System 1000 further supports multiple external data sources as well as its own embedded marketing data mart ("MDM"). It connects to multiple external databases to allow marketers to develop their customer segments on their own marketing data. These sources could be a marketing data mart, enterprise data warehouse or some other source. In addition, system 1000 has its own embedded MDM in its application data repository to store customer master data, customer contact history and other customer transaction data like orders, responses and other information.

A Marketing KnowledgeBase contains company marketing data in one central repository. The spreadsheets, file folders, project plans and personal databases marketers use to track expenses, projects, collateral and customer lists may be replaced with the KnowledgeBase. This data repository includes campaign management specific information including offers, treatments, tasks, campaign schedules and campaign segments. The KnowledgeBase is in the exemplary embodiment an open relational database that consists of hundreds of tables with thousands of fields. The open relational structure supports built-in operational reports and the use of external reporting tools. Marketing applications may share the KnowledgeBase, so all Marketing applications may work seamlessly together.

Marketing Data Mart—In cases where the company does not have an external marketing database, the Marketing KnowledgeBase offers an integrated Marketing Data Mart ("MDM"). At the base of the MDM is the Audience Member entity, which acts as a Customer and/or Prospect Master. A system administrator may extend the Audience Member to support specific user-defined attributes required to describe the customer or prospect. In addition, the MDM allows for the inclusion of customer-defined transaction information such as orders, contact history, response history and accounts. The embedded Marketing Data Mart tables may all be loaded from external sources using software tools for extracting, matching and merging external data sources into the MDM.

Many marketing organizations today have invested heavily in their own marketing data infrastructure including developing their own marketing data marts. These data marts consolidate marketing data from multiple data sources using the organization's business rules, aggregations and definitions. They are designed and tuned specifically to support marketing segmentation and analytics. To take advantage of this valuable marketing resource, system 1000 may access and segment against one or many external marketing databases.

In this exemplary embodiment, a system administrator or power user defines the connections to the external marketing databases in a database list view. The administrator has the option to make the entire marketing database available, all tables and all fields, or define a subset of tables and fields to make available to the marketers. This is especially useful when there are specific tables that the marketer needs versus seeing all of the data and becoming overwhelmed. This feature may also protect customer privacy, allowing a system administrator to hide specific fields like Social Security numbers, unencrypted account numbers, credit scores or other personal information.

An exemplary embodiment of the invention may be based on Aprimo Marketing Campaign Manager version 7.5. The following information is provided for environment compatibility purposes only for this embodiment of the present invention. These requirements may change; according to changes in the various components of systems. The following operating environments are provided as examples of an implementation of the present invention, and are not necessarily required for such implementation.

The Aprimo Marketing Campaign Manager Web Server and Segmentation Services Server operate on Windows servers. The networked servers may include Internet Information Services (IIS), Microsoft .Net framework, and MS Data Access (ADO.NET). The Aprimo Marketing KnowledgeBase or application data repository can operate remotely on any hardware (UNIX or Windows), but the supported databases must be either SQL Server or Oracle using Unicode. The Aprimo Marketing Campaign Manager may natively access multiple external marketing databases including Oracle, DB2 or SQL Server. Aprimo Marketing Campaign Manager is a completely web-based application with no additional software or downloads required to be installed on the client computer. Aprimo Marketing supports both Windows and Macintosh computers. For Windows users, the recommended browser is Microsoft Internet Explorer. For Macintosh users, the recommended browser is Safari. Integrated reports can run as HTML reports or run as active content using Microsoft Java Virtual Machine (JVM) or Sun Java Runtime Engine (JRE).

A specific implementation of an embodiment of the present invention is provided in the attached Appendix A to the provisional application, and is incorporated by reference herein. A specific implementation of the Workflow aspect of the present invention, including many embodiments of the templates used in this aspect of the invention, is provided in the attached Appendix B to the provisional application, and which is incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer for implementing a marketing management system, said computer comprising:
a processor;
at least one database containing marketing information; and
a database segmentation manager coupled to said processor and said at least one database, said database segmentation manager including a node definition module and a node organizer, said node definition module for allowing user definition of a node as segments of said database, each said segment having associated criteria, said node organizer for maintaining concatenated nodes defining a subset of data from one of said at least one database, said node organizer being capable of creating a temp table and populating said temp table with results from a concatenation of a plurality of queries of said at least one database to create one of said concatenated nodes satisfying said associated criteria from said one of said concatenated nodes, said node organizer further manifesting said concatenated node and associating said concatenated node in the temp table with a tag for use in further queries.

2. The computer of claim 1 wherein said node organizer includes a dataset node for creating a subset of said database according to query criteria.

3. The computer of claim 2 wherein said database includes a plurality of fields and rows, and said dataset node includes software for creating a temp table storing a portion of said fields and rows obtained by the query criteria.

4. The computer of claim 1 wherein said segmentation manager includes universe display software enabling an external user to view said database and said concatenated nodes.

5. The computer of claim 1 further comprising a graphic workflow manager capable of providing a visual representation with a plurality of items from said database and having a place and an order of a plurality of work tasks relating to said database.

6. The computer according to claim 1 wherein said node organizer is capable of excluding predetermined entries in said temp table.

7. The computer according to claim 1 wherein said node organizer is capable of combining a plurality of concatenated nodes as part of said temp table creation.

8. The computer according to claim 1 wherein said node organizer is capable of splitting a plurality of temp tables from said temp table.

9. The computer according to claim 8 wherein said node organizer is capable of splitting said temp tables based on any combination of queries or criteria, random sort order, or sorted on an attribute or multiple attribute with no limits, limited by percentage, or limited by number of records for each temp table.

10. The computer according to claim 1 wherein said node organizer is capable of de-duplicating said temp tables in order to select one or some number of records that are in a same match group with a preference for a one target record based on a sort.

11. In computer, a method of managing marketing information in at least one database, said method comprising the steps of:
    segmenting the marketing information from the at least one database;
    creating a plurality of nodes from the segmented marketing information, at least one node being defined as a plurality of segments of said database, each said segment having associated criteria;
    concatenating nodes by creating a temp table and populating the temp table with results from a concatenation of a plurality of queries of the at least one database satisfying the associated criteria from the concatenated nodes, and manifesting the concatenated node with the temp table and associating the temp table with a tag for use in further queries; and
    accessing the marketing information via the tag of the concatenated nodes.

12. The method of claim 11 wherein said creating step includes creating a dataset node for generating a subset of said database according to query criteria.

13. The method of claim 12 wherein the marketing information is stored in a database including a plurality of fields and rows, and said accessing step includes creating a temp table for storing a portion of said fields and rows obtained by said accessing step.

14. The method of claim 11 further including the step of displaying a universe view enabling an external user to view the information and the nodes.

15. The method of claim 11 further comprising the step of providing a visual representation with a plurality of items from the marketing information and having a place and an order of a plurality of work tasks relating to the marketing information.

16. The method of claim 11 wherein the marketing information is stored in a database including a plurality of fields and rows, and said node creating step includes creating a temp table for storing a portion of said fields and rows of the temp table.

17. The method of claim 16 wherein said node creating step includes creating splitter nodes creating a plurality of temp tables from the temp table.

18. The method of claim 17 wherein said splitter node creates the plurality of temp tables based on any combination of queries or criteria, random sort order, or sorted on an attribute or multiple attribute with no limits, limited by percentage, or limited by number of records for each temp table.

19. The method of claim 11 wherein said node creating step includes creating a de-duplicating node for selecting one or some number of records that are in a same match group with a preference for a one target record based on a sort.

* * * * *